United States Patent
Manni

(10) Patent No.: US 11,360,369 B2
(45) Date of Patent: Jun. 14, 2022

(54) NONLINEAR OPTICAL DEVICES WITH ZIG-ZAG BEAM PATHS

(71) Applicant: Jeffrey G. Manni, Burlington, MA (US)

(72) Inventor: Jeffrey G. Manni, Burlington, MA (US)

(73) Assignee: JGM Associates, Inc., Burlington, MA (US)

( * ) Notice: Subject to any disclaimer, the term of this patent is extended or adjusted under 35 U.S.C. 154(b) by 0 days.

(21) Appl. No.: 16/655,218

(22) Filed: Oct. 16, 2019

(65) Prior Publication Data
US 2020/0117071 A1 Apr. 16, 2020

Related U.S. Application Data

(60) Provisional application No. 62/746,146, filed on Oct. 16, 2018.

(51) Int. Cl.
*G02F 1/39* (2006.01)
*G02F 1/35* (2006.01)

(52) U.S. Cl.
CPC .............. *G02F 1/39* (2013.01); *G02F 1/3501* (2013.01); *G02F 1/3503* (2021.01); *G02F 1/392* (2021.01)

(58) Field of Classification Search
None
See application file for complete search history.

(56) References Cited

U.S. PATENT DOCUMENTS

| | | | | |
|---|---|---|---|---|
| 5,052,780 A * | 10/1991 | Klein | ................... | G02B 27/126 359/638 |
| 5,640,480 A * | 6/1997 | Komine | ................... | G02F 1/395 385/122 |
| 7,426,075 B2 * | 9/2008 | Haidar | .................. | G02F 1/3534 359/326 |
| 7,590,160 B2 * | 9/2009 | Manni | ................... | H01S 3/0941 372/66 |
| 7,612,934 B2 * | 11/2009 | Bragg | ....................... | G02F 1/37 359/328 |
| 9,742,145 B1 * | 8/2017 | Huang | ................ | H01S 3/08095 |
| 10,444,597 B2 * | 10/2019 | MacGillivray | ........ | G02F 1/3544 |
| 2006/0114961 A1 * | 6/2006 | Manni | ................... | H01S 3/0941 372/70 |
| 2017/0229835 A1 * | 8/2017 | Manni | ................... | H01S 3/0941 |
| 2020/0117071 A1 * | 4/2020 | Manni | ................... | G02F 1/3501 |

OTHER PUBLICATIONS

M. Raybaut, A. Godard, C. Lubin, M. Lefebvre and E. Rosencher, "A Guided Wave Approach to Fresnel Phase Matching: Application to Parametric Oscillation and Terahertz-Wave Generation," 2006 Conference on Lasers and Electro-Optics and 2006 Quantum Electronics and Laser Science Conference, 2006, pp. 1-2. (Year: 2006).*

* cited by examiner

*Primary Examiner* — Rhonda S Peace
(74) *Attorney, Agent, or Firm* — Joseph Stecewycz

(57) ABSTRACT

The invention is an optical parametric oscillator or amplifier employing a zig-zag beam path, configured using dichroic mirrors or optical surfaces on the side-walls of a solid-state, liquid, or gaseous nonlinear medium, to control conversion efficiency, beam quality, or other aspects of the nonlinear conversion process by dumping unwanted radiation, the oscillator/amplifier for use with any nonlinear process in which it is advantageous to have one or more of interacting coherent beams be partially or fully transmitted at reflection points of the zig-zag path.

18 Claims, 16 Drawing Sheets

NONLINEAR OPTICAL DEVICES WITH ZIG-ZAG BEAM PATHS

CROSS REFERENCE TO RELATED APPLICATION

The present Application is related to Provisional Patent Application entitled "Nonlinear Optical Devices with Zig-zag Beam Paths," filed 16 Oct. 2018 and assigned filing No. 62/746,146, incorporated herein by reference in its entirety.

FIELD OF THE INVENTION

The invention relates to sources of coherent laser emission that use nonlinear optical methods to convert coherent light emission at one or more input wavelengths to coherent light emission at one or more output wavelengths. The invention employs a zig-zag beam propagation path, configured using dichroic thin-film or other dichroic optical coatings on one or more optical surfaces to control to some aspect of the wavelength conversion process. Such aspects might include emitted beam quality, the combination of wavelengths being generated, and conversion efficiency into a specific wavelength, among others.

BACKGROUND OF THE INVENTION

Nonlinear optical methods or processes are widely used for converting the wavelength(s) of coherent electromagnetic light emission from an input source, or sources, into coherent emission at one or more output wavelengths. Examples include harmonic generation (second, third, and higher harmonics); sum and difference frequency mixing; optical parametric generation, amplification, and oscillation; four-wave mixing; and stimulated Raman generation. Other nonlinear conversion processes exist that may involve one to four and even more beams that interact in an optical medium exhibiting a nonlinear response (nonlinear polarization).

As is well-known, a three-wave optical parametric oscillator (optical parametric oscillator) or optical parametric amplifier (optical parametric amplifier) device employs a pump laser, having a pump laser wavelength, to generate two lower-energy photons. These lower-energy photons are generated at two different wavelengths: a "signal" wavelength and an "idler" wavelength. One signal and one idler photon are generated for each pump photon converted in the optical parametric oscillator device. Pump, signal, and idler wavelengths are related according to Eq. 1, $$\frac{1}{\lambda_p} = \frac{1}{\lambda_s} + \frac{1}{\lambda_i} \qquad 1)$$

where $\lambda_{p,s,i}$ are the pump, signal, and idler wavelengths, respectively. The specific combination of signal and idler wavelengths generated by the optical parametric oscillator, for a given pump wavelength, depends on so-called "phase-matching" conditions selected by the optical parametric oscillator designer, which in turn depend on the nonlinear crystal material and how it is fabricated, the propagation angles of the pump, signal, and idler beams in the nonlinear crystal, the temperature of the nonlinear crystal, and other design and operating factors. An attractive feature of optical parametric oscillators is that the signal and idler wavelengths can be varied or "tuned" over a broad wavelength range by changing some operating parameter (temperature, propagation angles, etc.) associated with phase-matching conditions. The various methods for wavelength-tuning of an optical parametric oscillator are well-known in the art.

In its simplest form, an optical parametric oscillator consists of one or more nonlinear crystals in a linear resonator consisting of a mirror on one side of the optical parametric oscillator crystal(s), and another mirror on the other side of the optical parametric oscillator crystal(s), thereby configuring a two-mirror resonator and a two-mirror optical parametric oscillator.

PRIOR ART

Komine U.S. Pat. No. 5,640,480 issued Jun. 17, 1997 and entitled "Zig-zag Quasi-phase-matched Wavelength Converter Apparatus" discloses combined use of collinear phase matching, quasi-phase-matching, total internal refection, and a zig-zag beam path in an optical parametric oscillator or amplifier. Their invention requires the use of quasi-phase-matching and cannot be used with other phase-matching schemes. Their invention also requires the use of total internal reflection (TIR) as a means to configure a zig-zag optical path for all of the collinearly interacting beams in the nonlinear medium; none of the interacting waves are removed or dumped at any the bounce points of the zig-zag path.

Quasi-phase-matching is achieved by using the relative phase shift that occurs due to TIR at each bounce point to compensate for the phase mismatch between the interacting waves that would otherwise occur due to dispersion in the nonlinear medium. That is, TIR at the bounce points of the zig-zag path is required to achieve the desired quasi-phase-matching. Accordingly, the Komine method is practically limited to use with relatively thin solid-state nonlinear media (thickness of 500 microns or less).

Huang et al. U.S. Pat. No. 9,742,145 issued Aug. 22, 2017 and entitled "Off-axis Zig-zag Parametric Oscillator" discloses a parametric oscillator in which at least one of the parametrically-generated waves (signal and/or idler) follows a zig-zag beam path through the nonlinear medium. The zig-zag path may be configured by total internal reflection at the side walls of the nonlinear medium or by reflection at thin-film optical coatings on the side walls. However, in the Huang method, the pump beam necessarily makes a straight-through pass in the nonlinear medium and does not follow a zig-zag beam path.

The Huang invention is intended for use with optical parametric oscillators that employ non-collinear phase-matching schemes, and especially ones involving a rather large angle between the pump beam and at least one of the parametrically generated beam(s) generated in the optical parametric oscillator (i.e., the beam that follows a zig-zag beam path). The Huang design may not be practical for use with collinear phase-matching schemes.

BRIEF SUMMARY OF THE INVENTION

In one aspect of the present invention, a nonlinear optical parametric oscillator comprises a nonlinear medium having a first side wall and a second side wall, the first side wall having a first optically polished surface, the second side wall having a second optically polished surface; an input beam of coherent radiation, the beam of radiation including at least two collinear beams of different wavelengths; a first coating on the first side wall, the first coating partially or completely transmitting at one or more wavelengths of the collinear beams, the first coating covering at least a portion of the first optically polished surface; a second coating on the second side wall, the second coating partially or completely transmitting at one or more wavelengths of the collinear beams, the second coating covering at least a portion of the second optically polished surface; such that a zig-zag path is established having one or more bounce points on the upper side wall and on the lower side wall, and dumped light is emitted from at least one bounce point.

The additional features and advantage of the disclosed invention is set forth in the detailed description which follows, and will be apparent to those skilled in the art from the description or recognized by practicing the invention as described, together with the claims and appended drawings.

A key aspect of the present invention is that at least one of the coherent beams interacting in the nonlinear medium is completely or partially transmitted out of the nonlinear medium, and is enabled to do so at one or more "bounce points" (reflection points) of a zig-zag beam path traversed by the interacting beams in the nonlinear medium. This zig-zag beam path is established by selective placement of dichroic optical coatings or surface treatments on the optically polished side walls of the nonlinear medium. As is known in the relevant art, a dichroic mirror is one that has different reflectivity and transmission values for at least two of the interacting wavelengths in the nonlinear medium. A dichroic surface treatment may, for example, be a meta-, micro-, or nano-structured optical surface that is designed to have different reflectivity or transmission of beams at different wavelengths, each of which beams may impinge on the surface at the same or different angles of incidence.

The present invention can be used with solid-state, liquid, and gaseous nonlinear media, where the term nonlinear "medium" is used herein to indicate any of solid-state, liquid, and gaseous nonlinear media. A solid-state laser medium may be in the form of a nonlinear crystal, for example, having the required dichroic reflective side walls. A liquid or gaseous nonlinear material may be enclosed in an optical cell, for example, having the required reflective side walls of the cell that establish a zig-zag beam path.

The present invention provides a nonlinear optical wavelength converter that incorporates a zig-zag optical beam path designed to control conversion efficiency, beam quality, or some other aspect of the emission being generated, by enabling at least one of the interacting waves to be partially or fully transmitted (removed) from the nonlinear medium at one or more bounce points (reflection points) of the zig-zag beam path, using dichroic thin-film or other dichroic optical coatings, or dichroic optical meso- or nano-structures, at the bounce points.

The present invention provides a nonlinear optical wavelength converter incorporating a zig-zag optical beam path in a nonlinear optical medium, and an external optical resonator, such that the zig-zag beam path and external resonator can be designed independently to control back-conversion, conversion efficiency, beam quality, or some other aspect of the emission being generated.

The present invention provides a nonlinear optical wavelength converter incorporating a zig-zag optical beam path in a nonlinear optical medium such that the zig-zag beam path is designed to control some aspect of the emission being generated in an optical parametric oscillator, optical parametric amplifier, Raman laser, or four-wave mixing device, or any other nonlinear optical device that can benefit from selective reflection or transmission of at least one of the interacting waves at one or more bounce points of the zig-zag optical path.

In contrast to the Komine device referenced above, the present invention does not require the use of a collinear phase-matching scheme, and does not require use of quasi-phase-matching, although the disclosed method is compatible with such configurations. The disclosed design can be used with virtually any collinear phase-matching or quasi-phase-matching scheme, and with non-collinear phase-matching schemes as well, in particular, for smaller non-collinear angles. When quasi-phase-matching (QPM) is used in the present invention, the nonlinear material itself is designed and fabricated to provide the needed quasi-phase-matching. Relative phase shift between the interacting beams at the bounce points of the zig-zag path plays no substantial role in achieving phase-matching as needed for efficient conversion. The reflective surfaces on the side walls of the nonlinear medium are preferably dichroic surfaces that reflect the signal wavelength (or alternatively the idler wavelength), and partially or fully transmit the idler wavelength (or alternatively, the signal wavelength), i.e., the "dumped" wavelength, in order to directly control conversion efficiency, beam quality, or some other aspect of the emitted light. The Komine device does not teach the use of dichroic coatings on surfaces and, in fact, requires the use of total internal reflection (TIR) to establish a zig-zag beam path. Further, the Komine device does not teach about controlling back-conversion with proper design of the zig-zag path while at the same time achieving an optical parametric oscillator resonator design having a Fresnel number near or equal to one when such is needed or desired.

In contrast to the Huang device, discussed above, the present invention does not have a pump beam that makes a straight-through pass in the nonlinear medium, and the pump beam necessarily follows the same, or substantially the same, zig-zag path as the nonlinearly generated beams. It is this feature which makes the disclosed design compatible with collinear phase-matching. Also, when the present invention is used with a non-collinear phase-matching scheme, it does not necessarily involve the generation of "two second waves that emit symmetrically about the pump beam axis" as happens in the Huang device.

Rather, in the present design, the reflective coatings on the side walls of the nonlinear medium are preferably dichroic coatings or surfaces that reflect the signal wavelength (or alternatively the idler wavelength), and partially or fully transmit the idler wavelength (or alternatively the signal wavelength), i.e., the dumped wavelength, in order to directly control conversion efficiency, beam quality, or some other aspect of the emitted light. Huang does not teach this. Specifically, and for example, Huang does not teach about controlling back-conversion in an optical parametric oscillator with proper design of the zig-zag beam path and dichroic coatings, and does not teach about achieving an optical parametric oscillator resonator design having a Fresnel number near or equal to one, when such is desired, while also reducing back-conversion.

In its simplest form, an optical parametric oscillator consists of one or more nonlinear crystals in a linear resonator consisting of a mirror on one side of the optical parametric oscillator crystal(s), and another mirror on the other side of the optical parametric oscillator crystal(s), thereby configuring a two-mirror resonator and a two-mirror optical parametric oscillator. It should be understood that, although the present invention is described in the context of a two-mirror optical parametric oscillator, for clarity of discussion, the present invention also applies to optical parametric oscillators that employ three or more mirrors in a linear or ring resonator configuration. Furthermore, the present invention may also be applied to optical parametric amplifier devices that employ no resonator at all.

In a conventional optical parametric oscillator configuration, the pump, signal, and idler beams would travel collinearly straight through the nonlinear crystal(s) in a partially or completely spatially overlapped fashion. The pump, signal, and idler beams typically enter and exit the nonlinear crystal(s) through crystal "end faces" and without reflecting off or transmitting through the "side walls" of the nonlinear crystal(s). The side walls of the nonlinear crystal(s) are often not optically polished, and may be ground (optically rough) surfaces since the interacting beams are not intended to transmit through or reflect off the side walls.

In the novel optical parametric oscillator configuration disclosed herein, the interacting pump, signal, and idler beams are made to follow a zig-zag path through the nonlinear medium, rather than passing straight through the nonlinear crystals(s). The side walls of the nonlinear medium are optically polished and have thin-film or other optical coatings that are "dichroic" in the sense that the reflectivity and transmission of these coatings are substantially different for at least one of the interacting beam wavelengths compared to that for the other interacting beam wavelengths.

The present invention does not require collinear propagation of the interacting light beams. In some of the disclosed configurations, there may be different small angles (less than 10 degrees, for example) between two or all of the interacting beams; and the angles may differ for different pairs of interacting beams. For the purposes of this invention, the main issues involved with such "non-collinear" propagation are that (a) the interacting beams should all follow a zig-zag path rather than passing straight through the nonlinear medium, (b) beams should remain reasonably well spatially overlapped over some significant distance within the nonlinear medium as needed for the nonlinear process to occur efficiently, and (c) the beams intended for emission from the device should not "clip" or be blocked at some physical edge or aperture in the device. In particular, the interacting non-collinear beams follow "substantially the same" zig-zag paths involving a similar number of zig-zag legs and bounce points, leg lengths, and fold angles.

The pump beam may be injected into the disclosed optical parametric oscillator through a mirror which may be highly or partially transmitting at the pump wavelength. Another mirror of the optical parametric oscillator may be highly reflective, partially reflective, or highly transmitting at the pump wavelength. The optical parametric oscillator mirrors have high or partial reflectivity at the signal wavelength (for a signal-resonant optical parametric oscillator), or at the idler wavelength (for an idler-resonant optical parametric oscillator). Both optical parametric oscillator mirrors may also have some reflectivity at the pump wavelength (for a pump-resonant optical parametric oscillator).

A key aspect of the present invention is that at least one of the interacting beam wavelengths (i.e., the "non-resonated" wave or "dumped" wave) is kept at a substantially lower intensity than that of the other interacting beam wavelengths along the legs of the zig-zag path. This is accomplished by properly designing both the dichroic optical coatings/treatments on the side walls of the nonlinear medium and details of the zig-zag beam path.

An important problem in optical parametric oscillator-optical parametric amplifier design is "back-conversion" which acts to convert signal and idler emission back into pump emission. When back-conversion occurs, conversion efficiency is reduced, beam quality of optical parametric oscillator or optical parametric amplifier emission at the signal and idler wavelengths is usually degraded, and the signal and idler emission spectra may be broadened or changed in some important way. In general, the effects of back-conversion become more severe as optical parametric oscillator/optical parametric amplifier efficiency is increased and more output energy is generated at the signal and idler wavelengths for a given pump energy. For devices with millijoule-level pump and output energy, back-conversion typically results in optical parametric oscillator emission beam quality in the $M^2=10$ to 20 range, and worse, and substantially reduced conversion efficiency. Mitigation of back-conversion is an important strategy for improving beam quality of optical parametric oscillators and optical parametric amplifiers that achieve high output energy.

One method to mitigate back-conversion in an optical parametric oscillator-optical parametric amplifier is to periodically "dump" or remove the signal wave or idler wave from the three-wave interaction so that the dumped wave builds up from a very low power level (e.g., from a quantum noise level) after each dumping event. In such a situation, the dumped wave never achieves high intensity as needed to combine with the resonated wave and convert back into pump power to any substantial degree. This periodic dumping may be accomplished by making at least one of the optical parametric oscillator mirrors partially or highly transmitting at the non-resonated wavelength.

In a conventional optical parametric oscillator, one can dump the signal or idler wave when the beams encounter a mirror of the optical parametric oscillator resonator. In a pulse-pumped optical parametric oscillator, the number of times that the signal or idler beam can be dumped during a pump pulse is determined by the pump pulse duration and the length of the optical parametric oscillator resonator. For example, for a given pump pulse duration, the number of times the resonated signal or idler wave hits the mirrors (in a two-mirror resonator) during the pump pulse duration is approximated as $2\tau_{pump}/\tau_{rt}=2\tau_{pump}/(2 L_{res}/c)$ where $\tau_{pump}$ is the pump pulse duration, $\tau_{rt}$ is the round trip time of the optical parametric oscillator resonator, $L_{res}$ is the optical length of the optical parametric oscillator resonator (nominally equal to the distance between the two optical parametric oscillator mirrors), and c is the speed of light.

Therefore, one strategy for reducing back-conversion in an optical parametric oscillator is to use a shorter optical parametric oscillator crystal in a shorter optical parametric oscillator resonator so that the resonated wave makes more bounces or reflections off the optical parametric oscillator mirrors during the pump pulse. Because a shorter optical parametric oscillator crystal length (length along the direction of the interacting beams) is being used, the non-resonated wave interacts with the resonated wave over a shorter distance before being dumped at one or both optical parametric oscillator mirrors, and the non-resonated wave cannot build to as high an intensity level as when a longer optical parametric oscillator crystal is being used. This situation may result in reduced back-conversion, which, in turn, may result in improved optical parametric oscillator conversion efficiency and, in some cases, somewhat improved beam quality for the emitted signal and/or idler beams.

The main problem with the above strategy for mitigating back-conversion is that it uses a relatively short optical parametric oscillator crystal in a relatively short optical parametric oscillator resonator. This situation increases the "Fresnel number", F, of the optical parametric oscillator resonator as given by $F=w^2/\lambda L$ where w is the radius of the pump beam's cross-section in the optical parametric oscillator crystal, λ is the wavelength of the resonated signal or idler wave, and L is the optical length of the optical parametric oscillator resonator. In general, laser and optical parametric oscillator devices associated with larger Fresnel numbers have worse beam quality, and devices with Fresnel numbers closer to one exhibit near-diffraction-limited or very good beam quality.

The present invention solves the above problem by configuring an optical parametric oscillator resonator in which the non-resonated wave can be dumped many more than two times for each round trip through the optical parametric oscillator resonator, and therefore many more times during the pump pulse. The non-resonated wave is never allowed to build to a high intensity as this may cause significant back-conversion when it interacts with the resonated wave. This is accomplished by controlling the number of reflections or bounces, leg lengths, and fold angles of the zig-zag path in the nonlinear medium, and by properly designing the dichroic coatings (or surface treatments) that establish the zig-zag path.

At the same time, by adjusting the separation distance between the mirrors of the optical parametric oscillator resonator configured around the nonlinear medium with zig-zag path, the resonator's Fresnel number can be made equal to one, or close to one, if one should desire such. That is, the zig-zag path and the optical parametric oscillator resonator's Fresnel number can be controlled independently as needed to mitigate back-conversion and improve beam quality.

Even though an optical resonator is not used, the invention can be applied with advantage in the design of optical parametric amplifiers. Beam quality of the optical parametric amplifier emission may be improved by designing the zig-zag beam path so that the dumped signal or idler wave (dumped at one or more bounce points) cannot build to a high intensity as needed to cause significant back-conversion when interacting with the amplified wave that is not being dumped.

The present invention may also be used in the design of other nonlinear optical devices for which it is desirable to have one or more of the interacting beams be partially or completely transmitted through a dichroic coating (or surface treatment) at one or more bounce points of the zig-zag beam path.

In a stimulated Raman laser, for example, the dichroic coatings used to configure the zig-beam path may be designed to reflect pump emission and emission at the first-Stokes wavelength, but not emission at the second-Stokes wavelength. That is, the dichroic coating(s) would have little or no transmission at the pump and first Stokes wavelengths, but would be highly or partially transmitting at the second-Stokes wavelength. In this way, generation of light at the second-Stokes wavelength might be suppressed or prevented so that more pump light is emitted from the device at the first-Stokes wavelength. Alternatively, the dichroic coating(s) might have high reflectivity at the pump, first-Stokes, and second-Stokes wavelengths, and partial or high transmission at the third-Stokes wavelength, as a way to stop cascaded Raman generation beyond the second-Stokes wavelength.

Nonlinear optical devices that employ four-wave mixing processes may also benefit. In coherent steady-state anti-Stokes Raman generation, which is a special case of four-wave mixing, it may be desirable to prevent conversion to the second-Stokes wavelength and convert as much pump light as possible into the first-Stokes wavelength. This situation might then result in more emission at the first anti-Stokes wavelength.

In general, nonlinear processes that involve multiple interacting beams in a nonlinear medium may benefit from having one or more of the interacting beams be partially or fully transmitted through the dichroic mirror coating(s) or surface treatments used to configure the zig-zag beam path, and do so at one or more of the bounce points of the zig-zag beam path.

The above discussion has related primarily to use of the invention in pulsed nonlinear optical devices. This is because many of the devices described above achieve higher conversion efficiency when used with high-peak-power, pulsed lasers. Nevertheless, the present invention may provide the same benefits in nonlinear devices pumped with continuous-wave (CW) or quasi-CW light sources.

Many types of nonlinear wavelength conversion processes can be implemented in liquid- and gas-phase nonlinear media. The invention can be implemented with such media by containing the liquid or gas in an optical cell having dichroic surfaces on the side walls of the cell to configure a zig-zag beam path. Alternatively, the optical cell can be placed between discrete mirrors that establish the zig-zag path, and that have the required dichroic optical coatings.

The present state of the art does not appear to disclose Raman devices, four-wave-mixing devices, or other nonlinear devices with multiple interacting beams that employ a zig-zag beam path and use dichroic (wavelength-selective) reflections at the bounce points of the zig-zag path to control some aspect of the nonlinear conversion process.

Many of the embodiments described below are in the context of two mirror optical parametric oscillator devices, but it should be understood that the present invention is not limited to such configurations. Many of the same benefits or advantages accrue to optical parametric oscillator and other nonlinear device designs that employ linear or ring resonators having three or more mirrors.

Other advantages and benefits of the present invention will become apparent in the discussion below. The foregoing general description and detailed descriptions below are intended only to be exemplary and explanatory and are not intended to be restrictive of the present invention.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention. The detailed descriptions of embodiments provided below are intended only to be exemplary and explanatory and are not intended to be restrictive of, or on, the invention.

Unless indicated otherwise, "highly reflecting" indicates a high reflectivity value in the range of 95% R to 100% R at the wavelength in question, "partially reflecting (PR)" indicates a reflectivity in the range of 10% R to 95% R, "highly transmitting (HT)" indicates a transmission value in the range of 90% T to 100% T, and "partially transmitting (PT)" indicates a transmission in the range of 10% T to 90% T. However, in general, the terms HR, HT, PR, and PT are understood by someone well-versed in the art and the above definitions are not intended to be restrictive.

Unless indicated otherwise, the terms "resonated" and "resonated wave" refer to waves or emissions that are intended to build up to a relatively high intensity level within the optical parametric oscillator resonator or along the zig-zag path. All resonator mirrors and dichroic coatings are either highly reflecting (HR) or partially reflecting (PR) at the resonated wavelengths. Conversely, "non-resonated" wave refers to the emission or waves that are not intended to build to a high intensity level, and, if any build-up should occur, the non-resonated intensity is intended to be much lower than that of the resonated wave. In general, at least one mirror of the optical parametric oscillator resonator, or at least one bounce point on the dichroic coatings, has high-transmission (HT) at the non-resonated wavelength(s) as needed to keep intensity of the non-resonated wave in the optical parametric oscillator resonator, and along the zig-zag path, well below that of the resonated wave. An important aspect of the present invention is that the intensity of the non-resonated wave(s) is kept at a relatively low level, compared to the resonated wave(s), as needed to control back-conversion or some other aspect of the nonlinear conversion process.

In the discussions below, the term "bounce point" refers to a location at which a beam reflection occurs, and the beam propagation direction changes, as needed to configure the desired zig-zag beam path. The term "dichroic coating" is meant to indicate a dichroic thin-film or other coating, or a meso-, micro-, or nano-structured surface that provides the needed wavelength selectivity.

Figure 1:
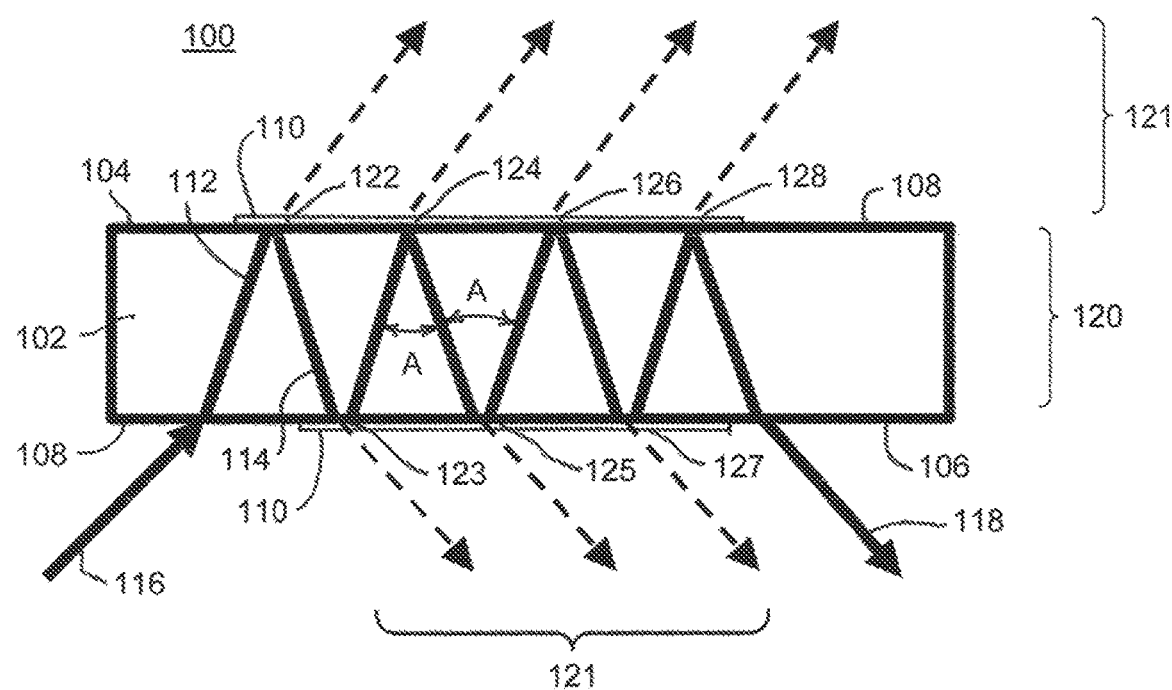
FIG. 1 shows a nonlinear medium having parallel side walls to create a zig-zag beam path through the nonlinear medium, in accordance with an aspect of the present invention.

FIG. 1 shows an exemplary embodiment of a nonlinear optical wavelength converter 100 producing collinear propagation of interacting beams in a zig-zag beam path 120 through a nonlinear medium 102 having parallel side walls 104, 106 that establish the zig-zag beam path 120. Only one of the interacting beams is shown for clarity of illustration. The upper side wall 104 and the lower side wall 106 are optically polished 108 and include a highly reflective dichroic thin-film 110 for most of the interacting beams in the beam path 120. The dichroic thin-film coatings 110 cover a portion of the respective upper side wall 104 and the lower side wall 106. The dischroic coatings 110 serve to reflect the interacting beams as needed to establish a zig-zag path having one or more reflection or "bounce points" 122, 124, 126, 128 on the upper side wall 104, and bounce points 123, 125, 127 on the lower side wall 106 and having two or more legs 116, 118 of the zig-zag beam path 110. The bounce points 122, 123, 124, 125, 126, 127 are uniformly-spaced and the beam legs, for example beam legs 112 and 114, all have equal length. Beam path "fold angles A" are all equal, as measured at the bounce points 122, 123, 124, 125, 126, 127. One or both side walls 104, 106 have the dichroic thin-film 110, or other surface treatment, that is partially or completely transmitting at one or more of the interacting beam wavelengths. This configuration, produces dumped light 121 as needed at the one or both side walls 104, 106 to control some aspect of the nonlinear conversion process.

Figure 2:
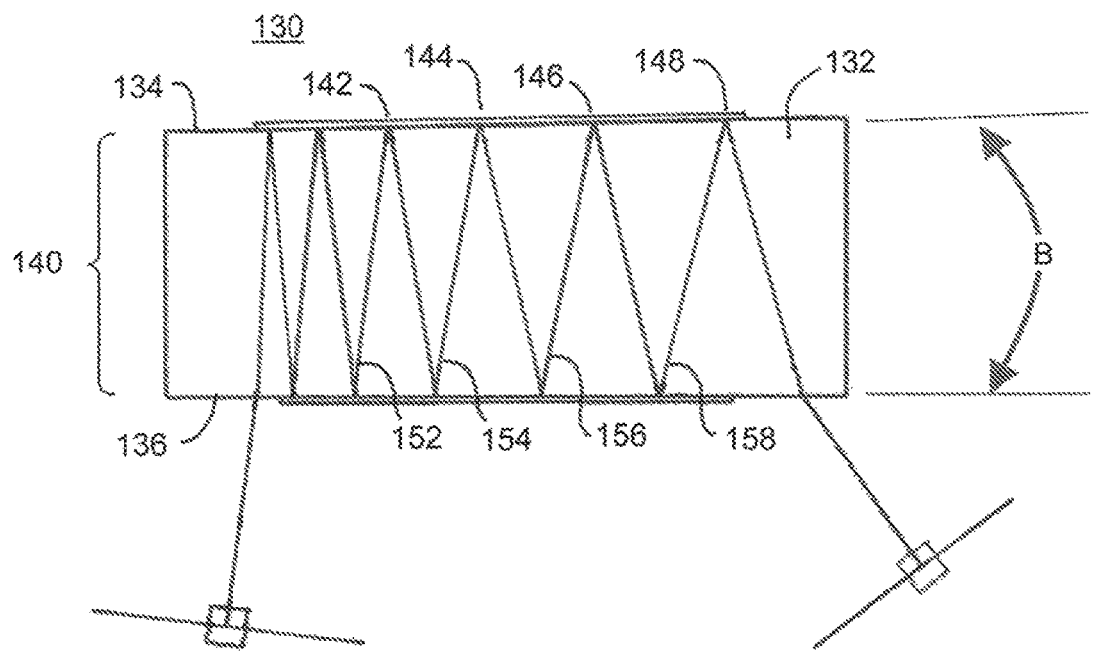
FIG. 2 shows a nonlinear medium having non-parallel side walls with a designed wedge angle between them, in accordance with an aspect of the present invention.

FIG. 2 shows an exemplary embodiment of a nonlinear optical wavelength converter 130 producing collinear propagation of interacting beams in a zig-zag beam path 140 through a nonlinear medium 132 having non-parallel side walls 134, 136 that establish the zig-zag beam path 140. Because the side walls 134, 136 are non-parallel to each other, there is a designed "wedge angle B" of greater than zero degrees between side walls, and bounce points 142, 144, 146, 148 are non-uniformly spaced, the lengths of the legs 152, 154, 156, 158 get progressively longer (or shorter), and the fold angles at the bounce points get progressively larger (or smaller) along the zig-zag beam path 140, depending on the propagation direction through the nonlinear medium 132 (i.e., left to right, or right to left). The wedge angle B between the side walls may result in a situation where not all of the zig-zag beam legs are in the same geometric plane, but in most cases they are in the same geometric plane.

While most of the anticipated embodiments of the invention described below involve parallel side walls, there may still be some situations in which having a designed wedge angle between the reflecting side walls provides a useful advantage. For example, having a zig-zag beam path in which the fold angles are all slightly different, as a result of having a wedge angle, might be used to improve nonlinear conversion in a situation involving a pump beam with a relatively broad emission spectrum. Other examples might make use of a zig-zag path in which the leg lengths get progressively longer or shorter along the zig-zag path.

Figure 3:
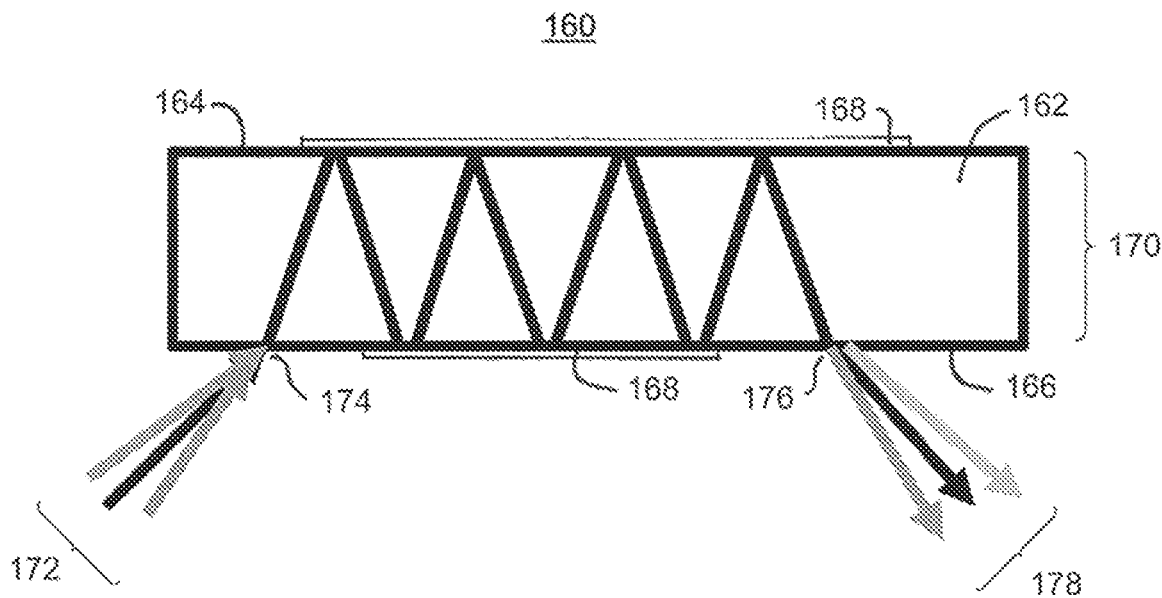
FIG. 3 shows a nonlinear medium having windows through which the multiple interacting beams having different wavelengths enter and exit with refraction at the entrance and exit surfaces, in accordance with an aspect of the present invention.

FIG. 3 shows an exemplary embodiment of a nonlinear optical wavelength converter 160 producing collinear propagation of interacting beams in a zig-zag beam path 170 through a nonlinear medium 162 having parallel side walls 164, 166 that establish the zig-zag beam path 170. Incident interacting beams 172 of different wavelengths enter the nonlinear medium 162 through a "window" 174 in a side wall coating 168. A second window 176 enables outgoing interacting beams 178 to exit the nonlinear medium 162. The windows 174, 176 may be uncoated optically polished surfaces or anti-reflection-coated regions of the nonlinear medium 162. The incident interacting beams 172 will refract at different angles as they enter and then exit the nonlinear medium 162 as beams 178.

Figure 4:
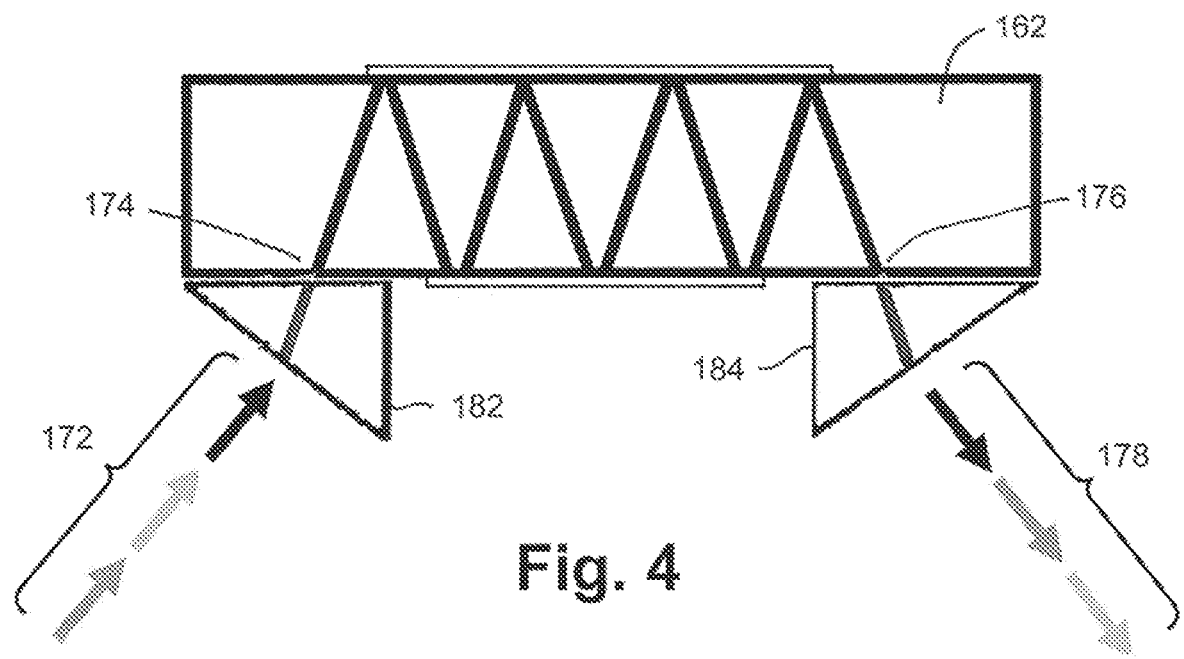
FIG. 4 shows a nonlinear medium having entrance and exit "prisms" such that beams having different wavelengths do not refract at the entrance and exit surfaces, in accordance with an aspect of the present invention.

If the incident interacting beams 172 are aligned to be collinear within the nonlinear medium 162, then the outgoing interacting beams 178 will propagate at different angles upon exiting the nonlinear medium 162. Alternatively, if the incident interacting beams 172 are collinear upon entering the nonlinear medium 162, the interacting beams 172 will have slightly different propagation angles and will not be collinear inside the nonlinear medium 162. In an alternative embodiment, prisms 182, 184 may be positioned at the window 174 and the window 176, respectively, as shown in FIG. 4. The prisms 182, 184 are preferably in virtual or optical contact with the nonlinear medium 162 so that no refraction occurs at the respective prism/medium interfaces. The incident interacting beams 172 are normal to the surface of the prism 182 so that the incident interacting beams 172 do not refract upon passing into the nonlinear medium 162. Accordingly, the incident interacting beams 172 are collinear inside and outside the nonlinear medium 162. The outgoing beams 174 exit normal to the surface of the prism 184 so that no refraction occurs.

The invention can be used with various phase-matching schemes that are well-known in the art. These include critical phase-matching, non-critical phase matching, quasi-phase-matching, and non-collinear phase-matching. In all cases described here, and others that may not be, it is possible to change phase-matching conditions by changing the fold angles at the bounce points of the zig-zag path, e.g., by changing the angle(s) of the input beams or by rotating the nonlinear medium. As an example, changing the fold angles might implemented as a way to tune the output emission wavelength(s) of an optical parametric oscillator or optical parametric amplifier device.

Figure 5:
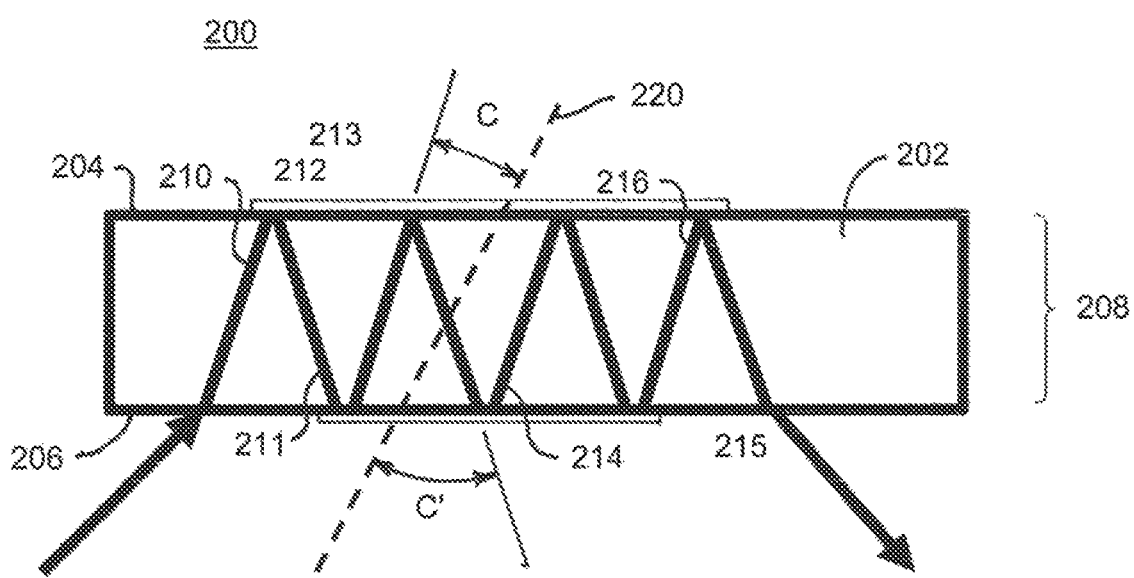
FIG. 5 shows a nonlinear medium in which critical phase-matching is employed, and in which critical phase-matching is achieved only in every other leg of the zig-zag beam path, in accordance with an aspect of the present invention.

FIG. 5 shows an exemplary embodiment of a nonlinear optical wavelength converter 200 fabricated from a critically-phase-matched nonlinear medium 202, here shown with parallel side walls 204, 206. Critical-phase matching is achieved only in every other beam leg 210, 212, 214, 216 of a zig-zag beam path 208. Each of the beam legs 210, 212, 214, 216 are oriented at an angle 'C' with a crystallographic axis 22 of the critically-phase-matched nonlinear medium 202. Critical-phase matching is not achieved in adjacent or alternate beam legs 211, 213, 215 of the zig-zag beam path 208 for the same set of interacting beam wavelengths because the angle 'C' between each of the alternate beam legs 211, 213, 215 and the crystallographic axis 212 is substantially different from angle C. Depending on details of the nonlinear process being used, and design details of the side-wall coatings being used, the lack of phase-matching in the alternate beam legs 211, 213, 215 may have no consequences, or may have consequences such as "dephasing," as well-known in the art, that could be detrimental to nonlinear conversion if not managed properly in the device design. In many cases, however, dumping one or more of the interacting wavelengths at the bounce points avoids dephasing problems.

Figure 6:
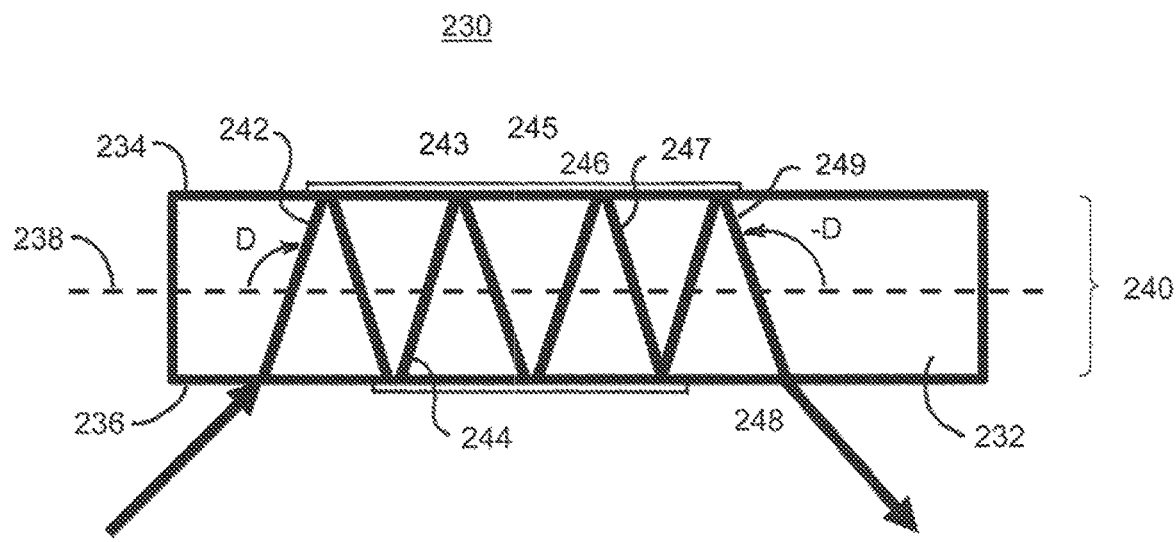
FIG. 6 shows a nonlinear medium in which critical phase-matching is achieved in all legs of the zig-zag beam path, in accordance with an aspect of the present invention.

There is shown in FIG. 6 an exemplary embodiment of a nonlinear optical wavelength converter 230 fabricated using a critically-phase-matched nonlinear medium 232, here shown with parallel side walls 234, 236. The nonlinear optical wavelength converter 230 achieves critical phase-matching (i) in all legs of a zig-zag beam path 240 and (ii) with the same set of interacting wavelengths. A crystal axis 238 has the property that non-critical phase-matching (NCPM) is achieved when all interacting beams propagate collinearly along the crystal axis 238. In the configuration shown, the crystal axis 238 is oriented parallel to the side walls 234, 236 of the nonlinear medium 232. In one pair of adjacent parallel zig-zag legs 242, 244 the beam propagation direction makes an angle 'D' with the crystal axis 238 such that a designed phase-matching scheme is achieved in the zig-zag legs 242, 244 for a set of interacting beam wavelengths. It should be noted that this set of wavelengths is different from the wavelength set that is phase-matched for collinear propagation parallel to the crystal axis 238.

The magnitude of propagation angle relative to the crystal axis 238 will be the same for an alternate set of adjacent parallel zig-zag legs 243, 245, 247, but with the opposite geometric sign, that is, oriented at an angle of '−D' with respect to the crystal axis 238. If the intended phase-matching scheme is insensitive to such a change, then critical phase-matching may be achieved in the alternate set of adjacent parallel zig-zag legs 243, 245 and for the same set of interacting beam wavelengths as in the parallel zig-zag legs 242, 244.

Figure 7:
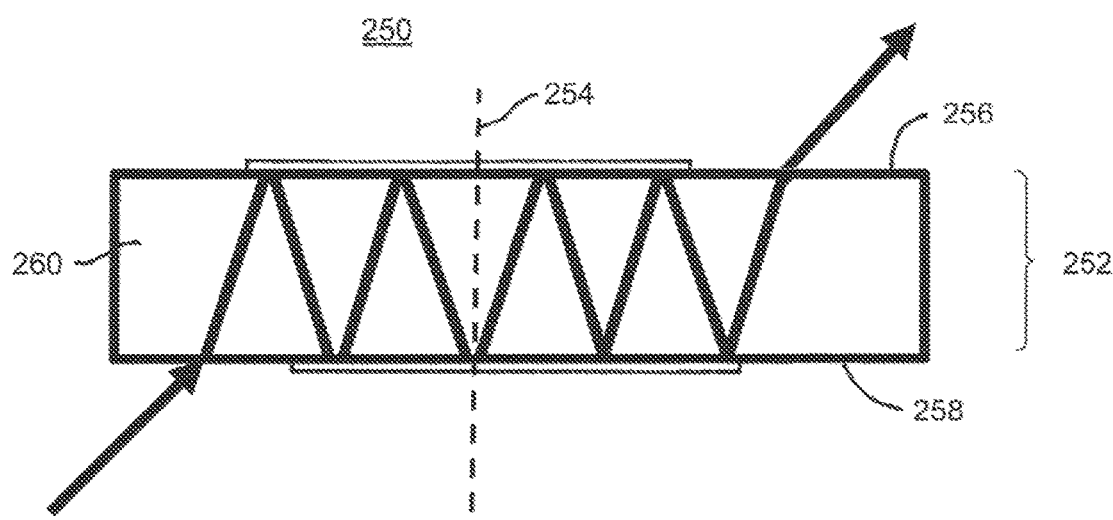
FIG. 7 shows a nonlinear medium in which critical phase-matching is achieved in all legs of the zig-zag beam path, in accordance with an aspect of the present invention.

FIG. 7 shows a similar critically-phase-matched nonlinear optical wavelength converter 250 that may achieve critical-phase-matching in all zig-zag legs 252 with the same set of interacting wavelengths, but with the difference that a noncritical phase matching axis 254 is oriented perpendicular to the parallel side walls 256, 258 of a nonlinear medium 260. It should be noted that the critical-phase-matching configurations of FIGS. 6 and 7 may be used to reduce the effects of "Poynting-vector spatial walkoff" in the critically-phase-matched interaction so as to improve conversion efficiency, beam quality, or some other aspect of the nonlinear process. Note that the critically-phase-matched nonlinear optical wavelength converter 250 is alternatively configured such that incident interacting beamsenter a window in the side wall 258, and emitted interacting beams exit a window in the opposite side wall 256.

Figure 8:
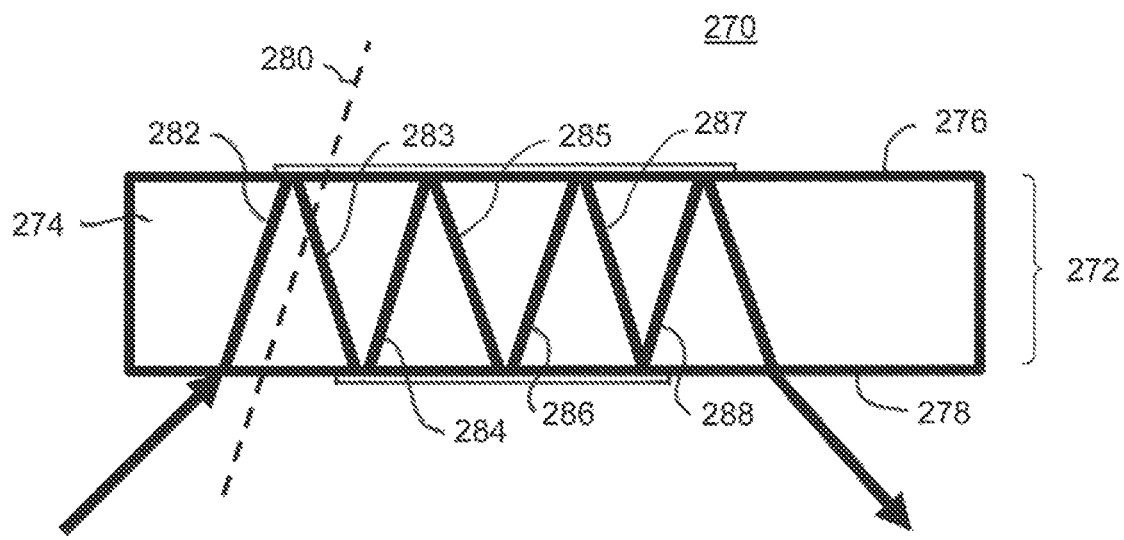
FIG. 8 shows a nonlinear medium in which non-critical phase-matching (NCPM) is employed, in accordance with an aspect of the present invention.

FIG. 8 shows an exemplary embodiment of a nonlinear optical wavelength converter 270 producing collinear propagation of interacting beams in a zig-zag beam path 272 through a non-critically-phase-matched nonlinear medium 274 having parallel side walls 276, 278 that establish the zig-zag beam path 272. The nonlinear medium 274 is oriented so that for a set of adjacent parallel zig-zag legs 282, 284 the beam propagation direction is parallel to a crystal axis 280 that achieves non-critical phase-matching for a set of wavelengths. Accordingly, non-critical-phase-matching is not achieved in an alternate set of adjacent parallel zig-zag legs 283, 285, where the beam propagation direction is not parallel to the crystal axis 280, for the same set of interacting beam wavelengths.

Figure 9:
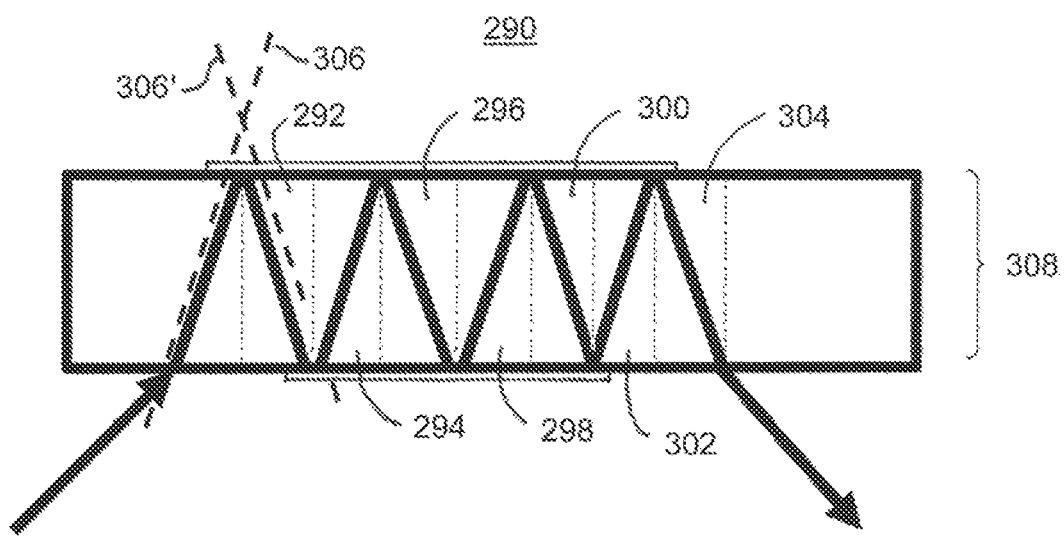
FIG. 9 shows an alternative non-critically-phase-matched configuration in which a nonlinear medium is fabricated in a series of adjacent layers, in accordance with an aspect of the present invention.

Depending on details of the nonlinear process being used, and design details of the side-wall coatings being used, the lack of phase-matching in the alternate set of legs may have no consequences or may have consequences such as "dephasing" that could be detrimental to nonlinear conversion if not managed properly. It can be appreciated that dumping one or more of the interacting wavelengths at one or more bounce points can be used to mitigate the effects of any dephasing that may occur. FIG. 9 shows an exemplary embodiment of alternative non-critically-phase-matched configuration in which a nonlinear medium 290 is fabricated in a series of adjacent layers 292, 294, 296, 298, 300, 302, 304 so that a non-critically-phase-matched configuration axis 306 in each layer changes direction at each bounce point as needed to maintain non-critically-phase-matched configuration in all legs of the zig-zag beam path 308, and for the same set of interacting wavelengths.

Figure 10:
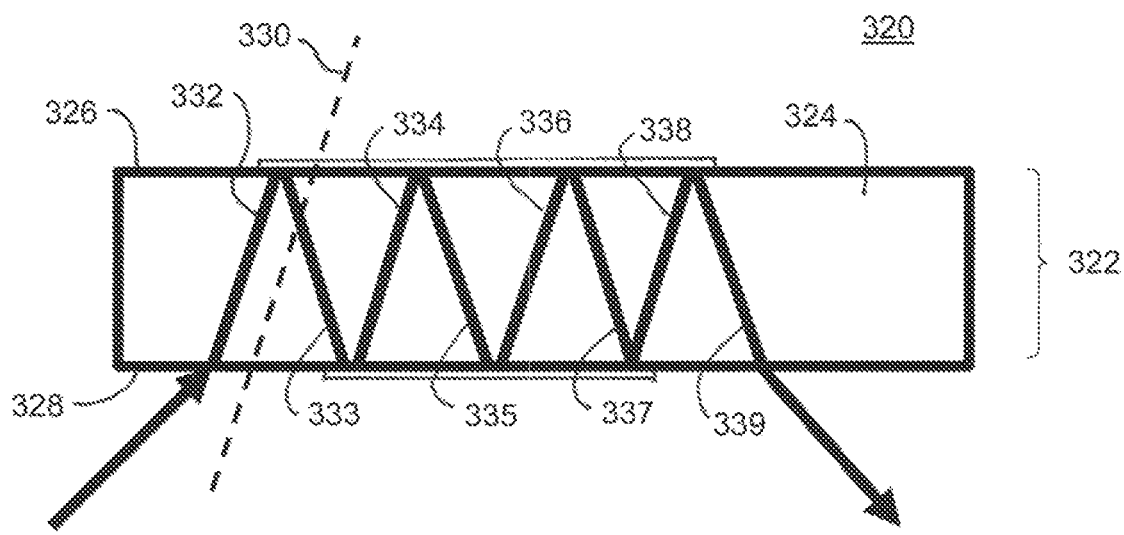
FIG. 10 shows a configuration producing collinear propagation of interacting beams in a zig-zag beam path through a quasi-phase-matched nonlinear medium, in accordance with an aspect of the present invention.

FIG. 10 shows an exemplary embodiment of a nonlinear optical wavelength converter 320 producing collinear propagation of interacting beams in a zig-zag beam path 322 through a quasi-phase-matched nonlinear medium 324 having parallel side walls 326, 328 that establish the zig-zag beam path 322. The nonlinear medium 324 is oriented so that in one set of parallel, nonadjacent zig-zag beam legs 332, 334, the beam propagation direction is along a grating vector 330 of the quasi-phase-matched nonlinear medium 324. The direction and grating period of the grating vector 330 is designed to achieve quasi-phase-matching for a set of interacting beam wavelengths.

Figure 11:
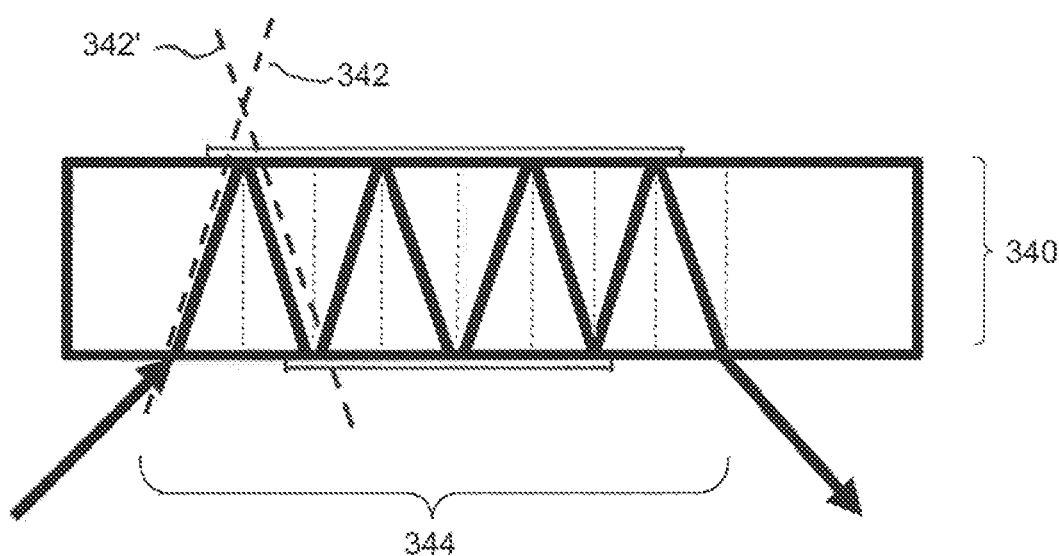
FIG. 11 shows an alternative quasi-phase-matching configuration in which a nonlinear medium is fabricated in layers, in accordance with an aspect of the present invention.

In comparison, quasi-phase-matching will not be achieved in an alternate set of parallel, nonadjacent zig-zag beam legs 333, 335, 337 for the same set of interacting beam wavelengths. Depending on details of the nonlinear process being used, and design details of the side-wall coatings being used, the lack of phase-matching in the alternate set of legs may have no consequences or may have consequences such as dephasing that could be detrimental to nonlinear conversion if not managed properly. In general, however, dumping one or more of the interacting wavelengths at one or more bounce points can be used to mitigate the effects of any dephasing that may occur. FIG. 11 shows an alternative quasi-phase-matching scheme in which a nonlinear medium 340 is fabricated in layers, similar to the configuration shown in FIG. 9. The corresponding grating vector 342 changes direction at each bounce point and remains parallel to the propagation direction of the interacting zig-zag beams in all beam legs. Quasi-phase-matching is thereby achieved in all beam legs of a zig-zag beam path 344 for the same set of interacting wavelengths.

Figure 12:
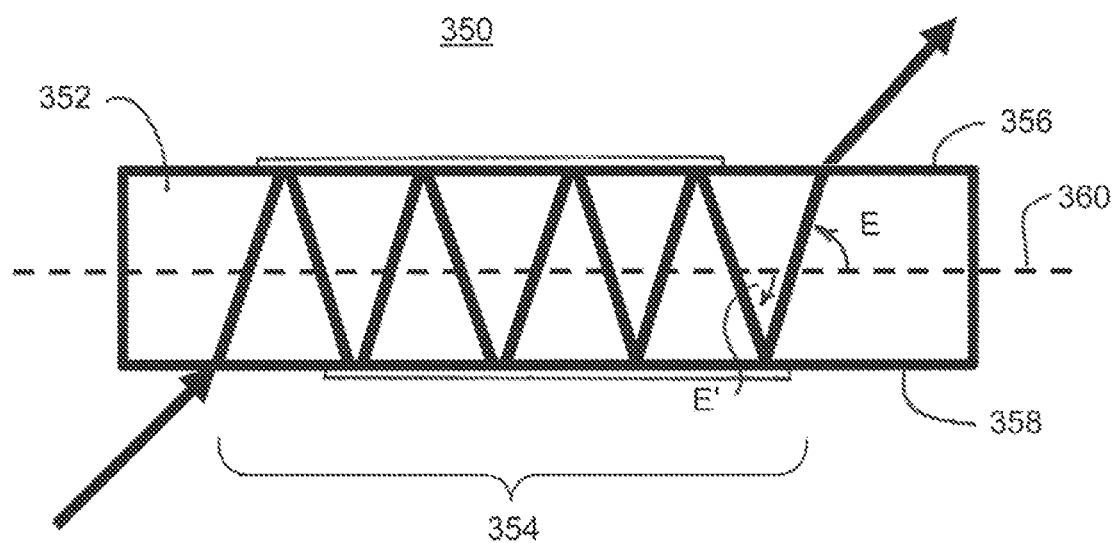
FIG. 12 shows a nonlinear optical wavelength converter having a quasi-phase-matching nonlinear medium such that all beam legs of a zig-zag beam path can be quasi-phase-matched for the same set of interacting beam wavelengths, in accordance with an aspect of the present invention.
Figure 13:
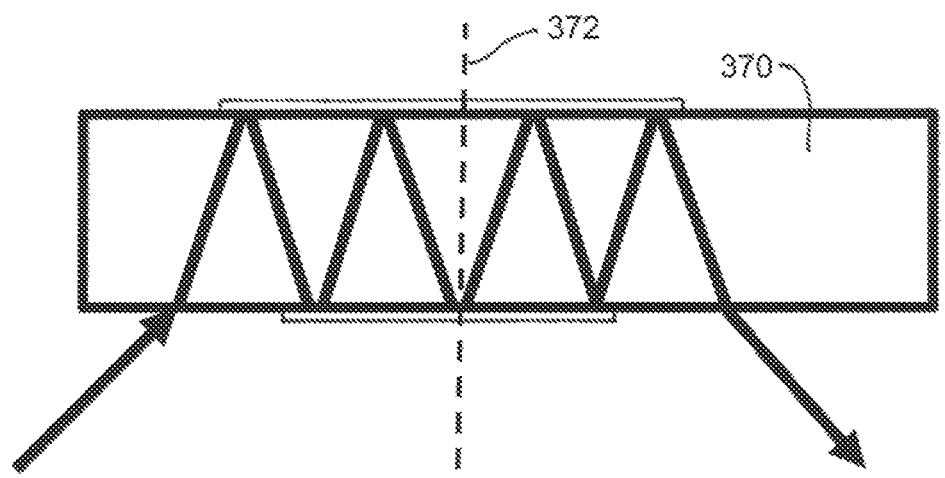
FIG. 13 shows a nonlinear optical wavelength converter having a quasi-phase-matching nonlinear medium in which a quasi-phase-matching grating vector is oriented perpendicularly to side walls of a nonlinear medium, in accordance with an aspect of the present invention.

FIG. 12 shows an exemplary embodiment of a nonlinear optical wavelength converter 350 configured to implement the present invention with a quasi-phase-matching nonlinear medium 352 such that all beam legs of a zig-zag beam path 354 can be quasi-phase-matched for the same set of interacting beam wavelengths, and so that all beam path legs can contribute to the nonlinear conversion process. Side walls 356, 358 of the nonlinear medium 352 are parallel. The nonlinear medium 352 is fabricated so that a quasi-phase-matching grating vector 360 is parallel to the side walls 356, 358. That is, the "grooves" of the periodically-poled grating (not shown) are perpendicular to the side walls 356, 358. In this case, each leg of the zig-zag beam path 354 makes the same angle 'E' with the grating vector direction, except for a change in geometric sign of the angle E for adjacent beam legs. Since quasi-phase-matching is not sensitive to this sign change, quasi-phase-matching is maintained for the same set of interacting beam wavelengths in each beam leg. This approach can also be used with the quasi-phase-matching grating vector 372 oriented perpendicularly to side walls of a nonlinear medium 370, as shown in FIG. 13.

Figure 14:
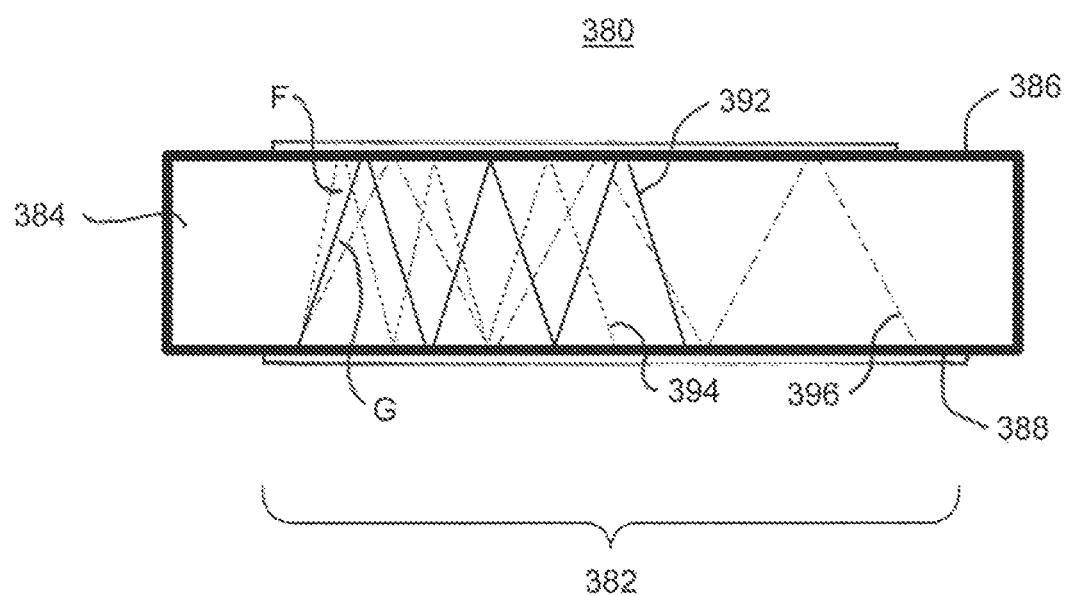
FIG. 14 shows a nonlinear optical wavelength converter in which non-collinear propagation of interacting beams occurs within a nonlinear medium, in accordance with an aspect of the present invention.

FIG. 14 shows an exemplary embodiment of a nonlinear optical wavelength converter 380 in which non-collinear propagation of interacting beams 382 occurs within a nonlinear medium 384 with parallel sidewalls 386, 388. This configuration may apply, for example, when a designed non-collinear phase-matching scheme is used to phase-match a set of interacting beam wavelengths. In such a case, interacting beams 392, 394, 396 have designed angles 'F' and 'G' between their respective propagation directions. This means that the resulting zig-zag beam paths through the nonlinear medium 384 will differ from one another, with different legs lengths, different bounce point locations, and different fold angles at the bounce points. This results in a "geometric walk-off" between the beams that reduces their spatial overlap as they propagate. When implementing non-collinear phase-matching in accordance with the present invention, the non-collinear beams should follow "substantially the same zig-zag beam paths" having a similar number of bounce points, similar leg lengths, and similar fold angles. The fold angles in FIG. 14 are exaggerated for clarity of illustration, and would typically be much smaller in practice.

Figure 15:
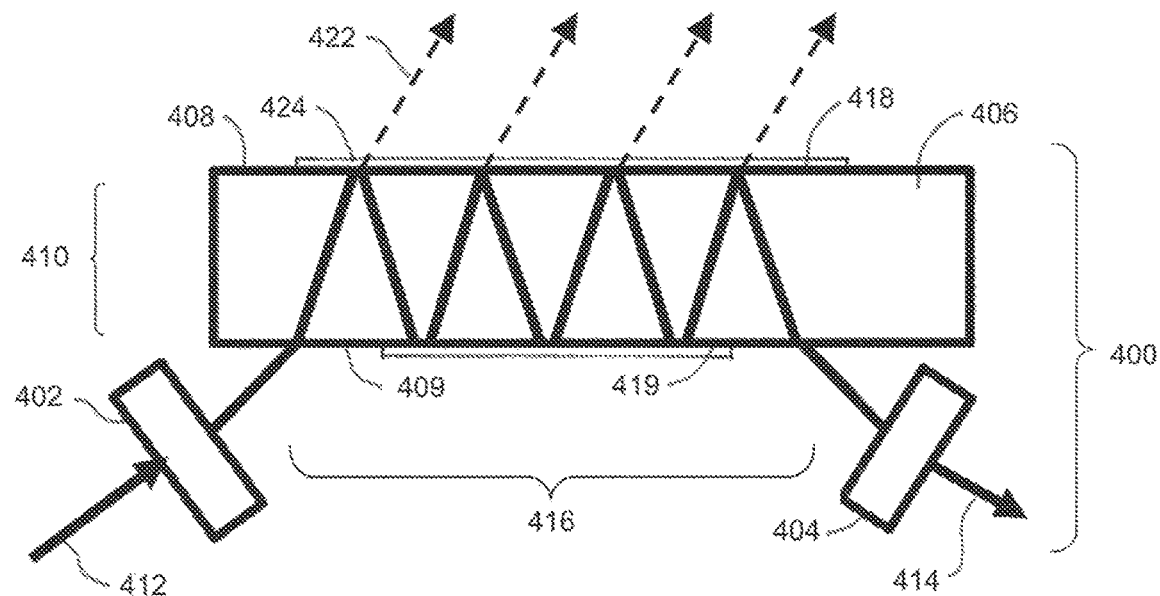
FIG. 15 shows a two-mirror optical parametric oscillator, in accordance with an aspect of the present invention.

FIG. 15 shows a singly-resonant optical parametric oscillator 400 including a nonlinear optical wavelength converter 410, an input mirror 402, and an output mirror 404. The nonlinear optical wavelength converter 410 includes a nonlinear medium 406 with optically polished side walls 408, 409 that may be either parallel as shown, or non-parallel (i.e., wedged). Pump light 412 is injected into the optical parametric oscillator 400 through the input mirror 402 which is typically highly transmissive at the pump wavelength and may be highly reflective at the resonated signal (or the idler) wavelength. The input mirror 402 may be highly transmissive, highly reflective, or partially reflecting at the non-resonated idler (or the signal) wavelength. The output mirror 404 may be partially reflecting at the resonated signal wavelength so that a resonated signal light 414 is emitted from the nonlinear medium 406 in the forward direction.

It should be noted that the resonated wavelength signal increasing in intensity when passing through the optical parametric oscillator 400 can be either (a) the resonated signal or (b) the idler wave generated by the optical parametric oscillator 400, and that the non-resonated wavelength, not intended to build up to high intensity in the optical parametric oscillator resonator 400, is a different wavelength generated by the optical parametric oscillator 400.

Non-parallel side walls 408, 409 may be desirable in certain situations, such as when trying to achieve phase-matching and optical parametric oscillator operation over a broader wavelength range. A resonator axis 420 of the optical wavelength converter 410 follows a zig-zag beam path 416 through the nonlinear medium 406 that is determined by how the input mirror 402 and the output mirror 404 are aligned relative to the nonlinear medium 406, and the three-dimensional orientation of the nonlinear medium 406 in space.

The optically polished side walls 408, 409 have respective dichroic coatings 418, 419 that are preferably highly reflective at the pump and signal (or the idler) wavelengths as needed (a) to pump the optical parametric oscillator 400 along most or all of the length of the zig-zag beam path 416, and (b) to resonate and build up the signal wavelength so that a much higher intensity is achieved inside the nonlinear optical wavelength converter 410 than the intensity of the idler wavelength. The dichroic coatings 418, 419 are partially transmitting or highly-transmitting at the non-resonated idler, or the signal, wavelength as needed to dump non-resonated energy 422 and keep the non-resonated wave intensity inside the nonlinear optical wavelength converter 410 much lower than that of the resonated wave.

In some situations, the dichroic coatings 418, 419 may be designed to force the non-resonated wave intensity at the beginning of each zig-zag leg to a low level near or equal to the quantum noise level. The output mirror 404 can be partially transmitting or highly transmitting at the non-resonated idler (or the signal) wavelength. The output mirror 404 is highly transmitting at the pump wavelength, thereby resulting in a single-pass-pumped, singly-resonant optical parametric oscillator. This configuration results in dumping of the non-resonated energy 422 at bounce points 424 on only one side wall 408 of the nonlinear medium 406.

Figure 16:
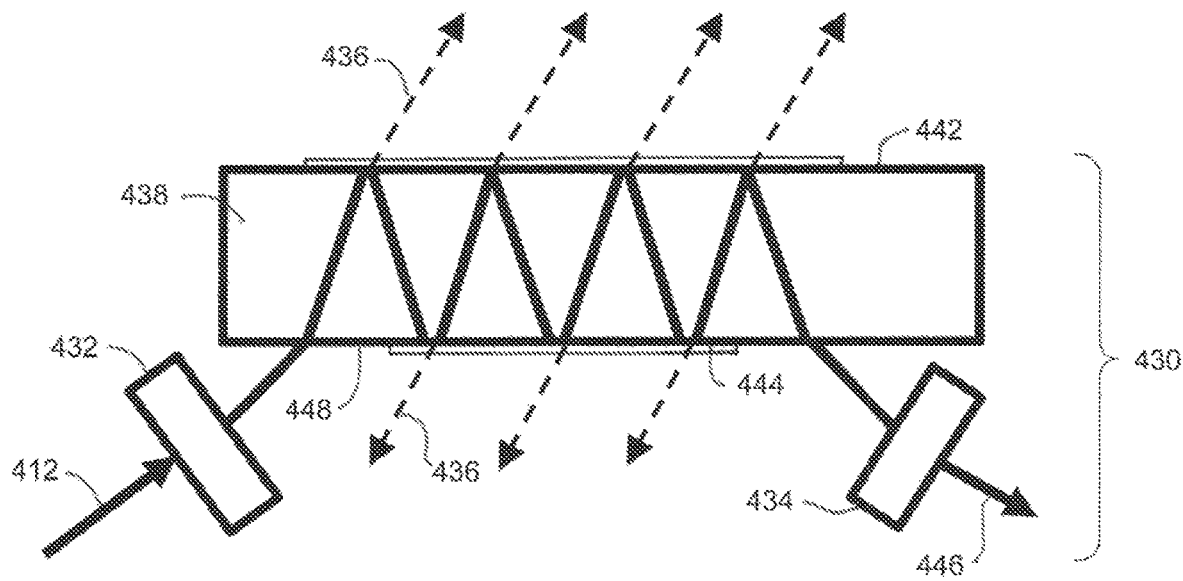
FIG. 16 shows a two-mirror optical parametric oscillator, in accordance with an aspect of the present invention.

As will be appreciated by one skilled in the relevant art, a singly-resonant optical parametric oscillator 430, shown in FIG. 16, can also be implemented by having an output mirror 434 be highly-reflecting or partially-reflecting at the pump wavelength, resulting in two-pass-pumping of the singly-resonant optical parametric oscillator 430. Two-pass pumping typically reduces optical parametric oscillator threshold. For two-pass pumping, non-resonated light 436 is dumped at bounce points on both sides 442, 444 of a nonlinear medium 438.

The pump beam 412 may, or may not be, collinear with a resonated signal output beam 446 at an output mirror 434.

As the input-output prisms 402, 404, shown in FIG. 4, are not used in the configuration of FIG. 16, then the interacting beams may be collinear in the nonlinear medium 438, or may be collinear outside the nonlinear medium 438, but not both at the same because the interacting wavelengths would refract with slightly different angles at input-output windows of a dichroic coating 448. If the interacting beams are non-collinear inside the nonlinear medium 438, then the above comments relating to non-collinear phase-matching may apply even if the intended phase-matching scheme is collinear.

Zig-zag path parameters, along with design of side-wall dichroic coatings, may be adjusted to control back-conversion in an optical parametric oscillator and thereby improve optical parametric oscillator emission beam quality and other aspects of optical parametric oscillator emission. As an example, if back-conversion in an optical parametric oscillator is high enough to objectionably degrade optical parametric oscillator beam quality, the number of zig-zag bounces may be increased to reduce zig-zag fold angles and leg lengths, and, if necessary, the width of a nonlinear medium may be reduced (perhaps while increasing its overall length) so that a non-resonated wave is dumped after a shorter leg length and at more zig-zag bounces for each round trip through an optical parametric oscillator resonator.

An input mirror and an output mirror can be spaced apart by a sufficiently large distance so as to achieve a resonator Fresnel number equal to one, or near one, if such a low Fresnel number is desired. This feature allows independent control of back-conversion, by optimizing the internal zig-zag path, and resonator Fresnel number. As can be appreciated from the above disclosures, adjustment of input-output mirror separation to control the Fresnel number, and optimizing the number of bounces to control back-conversion, are key innovations of the present invention.

Figure 17:
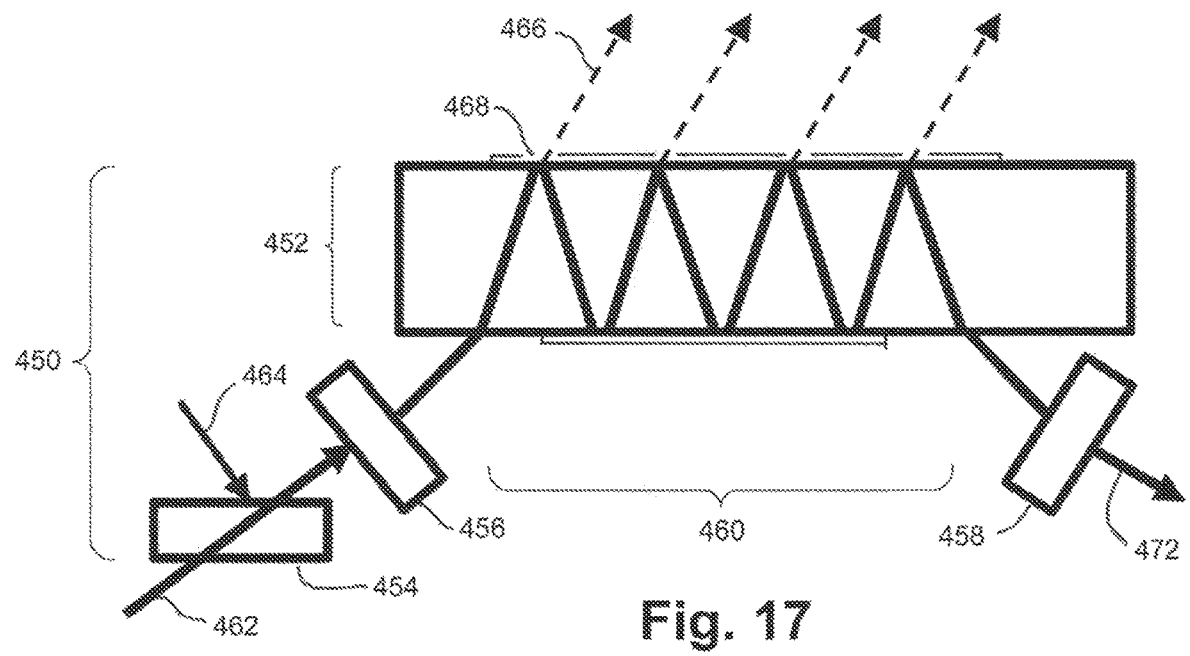
FIG. 17 shows injection-seeded two-mirror optical parametric oscillators, in accordance with an aspect of the present invention.

FIG. 17 shows an injection-seeded two-mirror optical parametric oscillator 450 including a nonlinear optical wavelength converter 452, a dichroic beamsplitter/combiner mirror 454, an input mirror 456, and an output mirror 458. A pump beam 462 and an injected seed signal, or idler, beam 464 used to injection-seed the optical parametric oscillator 450 may be combined using the dichroic beamsplitter/combiner mirror 454. The two beams 462, 464 may then be injected collinearly through the input mirror 456, which preferably has some reasonably high transmission at the pump beam wavelength and the injected seed signal beam wavelength.

Note that the pump and signal beams 462, 464 may be injected non-collinearly if the intended phase-matching process in the nonlinear operation is a non-collinear phase matching process. Non-resonated idler energy 466, is partially or completely transmitted at one or more bounce points 468. Because the seed signal beam 464 is at the resonated wavelength, the seed signal beam 464 traverses all or most legs of a zig-zag beam path 460. This configuration typically enables effective injection-seeding with less seed power or energy than might be needed in an alternative injection-seeding scheme, such as described below. A resonated-wave output beam 472 emerges through the output mirror 458 and has characteristics that may be controlled by the injection-seeding process, such as spectrally-narrowed emission spectrum, improved beam quality, or reduced optical parametric oscillator threshold/improved conversion efficiency.

Figure 18:
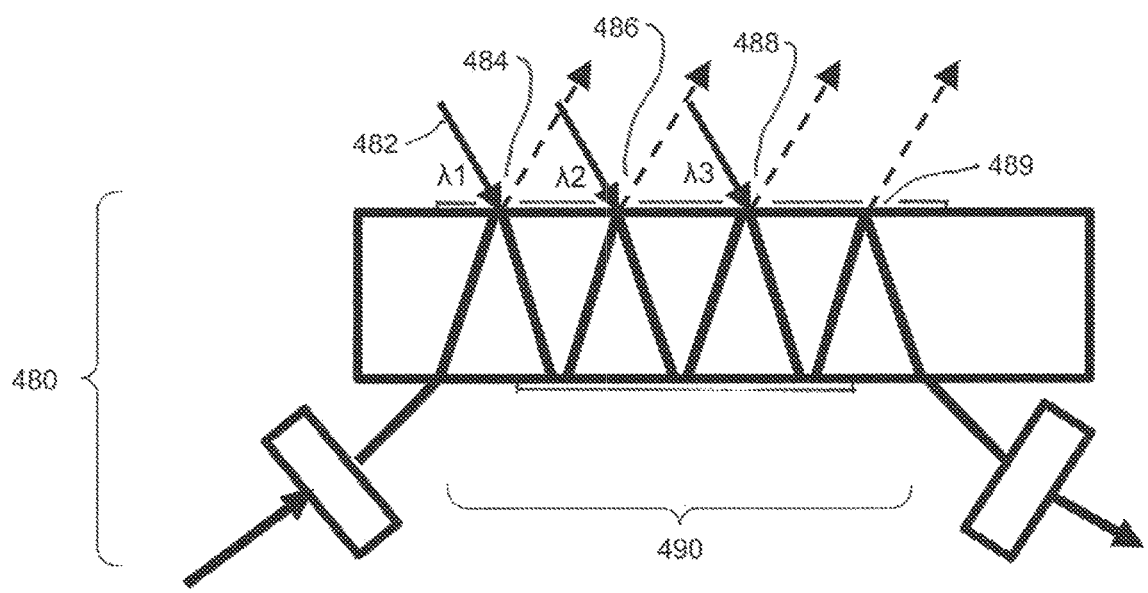
FIG. 18 shows injection-seeded two-mirror optical parametric oscillators, in accordance with an aspect of the present invention.

As is well-known in the art, an optical parametric oscillator may also be injection-seeded by injecting light at the non-resonated idler (signal) wavelength, instead of the resonated signal (idler) wavelength, as a way to control emission properties of the signal, idler, or both. In FIG. 18, seed light 482 at a non-resonated wavelength that is partially or completely dumped at one or more bounce points 484, 486, 488, 489 may be used to injection-seed an optical parametric oscillator 480 by injecting light at the non-resonated wavelength into the optical parametric oscillator 480 at one or more of the bounce points 484, 486, 488. In such a configuration, the injected seed light 482 traverses only one or a few beam legs of a zig-zag path 490 as the injected seed light 482 is partially or completely transmitted at the one or more bounce points 486, 488, 489.

Such an optical parametric oscillator configuration requires more seed power or energy to achieve effective seeding, compared to the configuration of FIG. 17. If optical parametric oscillator gain bandwidth and coating bandwidths are large enough, seed light at several different non-resonated idler (signal) wavelengths ($\lambda_1$, $\lambda_2$, $\lambda_3$ . . . ) may be injected at different bounce points 484, 486, 488, with each seed wavelength resulting in resonated-wave signal (idler) emission at the corresponding wavelengths dictated by Equation 1. This configuration can provide a straightforward way to make a rapidly line-tuned injection-seeded optical parametric oscillator, if the different seed wavelengths can be turned on and off in rapid succession.

The injection-seeded embodiments described in FIGS. 17 and 18 may be injection-seeded with one wavelength at a time, or with multiple wavelengths simultaneously, possibly resulting in injection-seeded operation at multiple signal and idler wavelengths simultaneously. The desired simultaneous multi-wavelength operation is achieved in practice by optimization of numerous optical parametric oscillator design and operating details.

Figure 19:
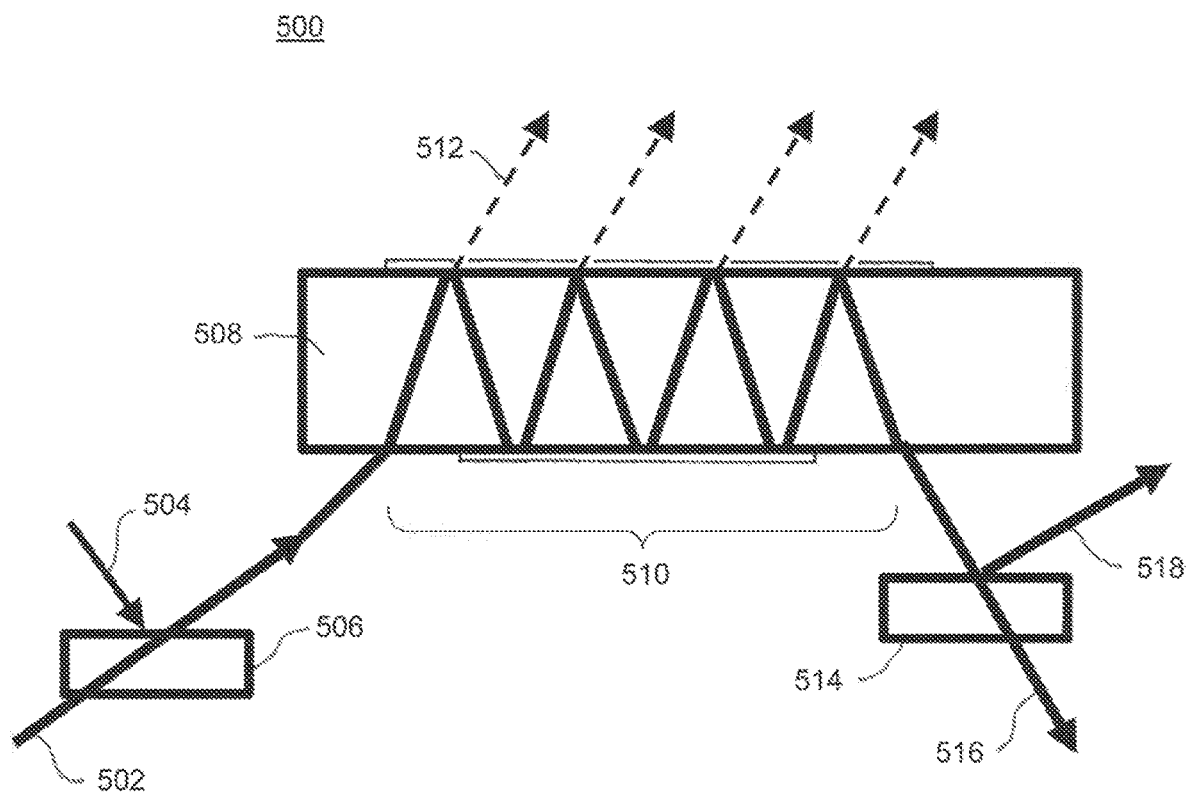
FIG. 19 shows a one-pass optical parametric amplifier, or an optical parametric amplifier, in accordance with an aspect of the present invention.

FIG. 19 shows a single-pass optical parametric amplifier 500. A pump beam 502 and signal (idler) beam 504 to be amplified may be combined at a dichroic combiner mirror 506 and injected into a nonlinear medium 508 as needed to make each beam 502, 504 follow a designed zig-zag path 510, or paths. Collinear phase-matching or non-collinear phase-matching may be used. A non-resonated idler (signal) beam 512 is partially or completely transmitted at one or more bounce points as needed, for example, to reduce back-conversion and improve beam quality of the signal (idler) beam 504 being amplified.

At the output of the optical parametric amplifier 500, a dichroic mirror 514 may be used to separate an amplified signal (idler) beam 516 from a residual pump beam 518. As will be appreciated by one versed in the art, the optical parametric amplifier 500 may be two-passed by reflecting the pump beam 502 and the signal beam 504 back into the nonlinear medium 508 such that the beams 502, 504 follow the same zig-zag path 510, but in the opposite direction. The two-pass optical parametric amplifier 500 may include a Faraday isolator (not shown) to isolate and use the resulting two-pass-amplified signal beam. The Faraday isolator is preferably designed for the signal wavelength and other appropriate beam separation optics.

Figure 20:
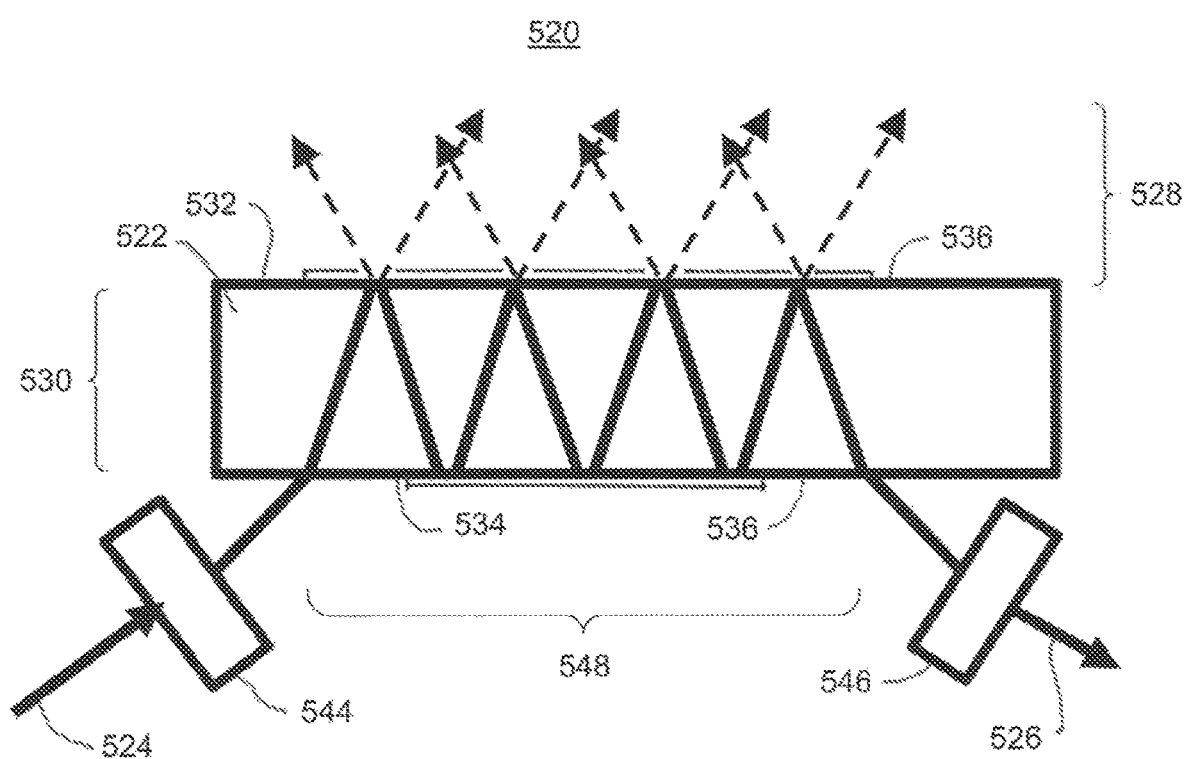
FIG. 20 shows a Raman laser that generates the first-Stokes wavelength, in accordance with an aspect of the present invention.

FIG. 20 shows an exemplary embodiment of a Raman laser 520 including a nonlinear Raman active medium 522 forming a stimulated Raman laser resonator 530. The Raman medium 522 is capable of generating, via stimulated Raman scattering, a desired first-Stokes ($S_n$) wavelength 526 when using a selected pump wavelength 524. Side walls 532, 534 of the nonlinear Raman active medium 522 may have dichroic coatings 536 designed to be (i) highly reflective at the pump wavelength 524 and the first Stokes wavelength 526, and (ii) partially or completely transmitting at a second-Stokes ($S_2$) wavelength 528 as needed to suppress the build-up of the second-Stokes wavelength 528 emission in Raman laser resonator 530.

An input mirror 544 of the Raman laser resonator 530 may be designed to be highly reflective at the first-Stokes wavelength 526, and an output mirror 546 may be designed to be partially reflecting (PR) at the first-Stokes wavelength 526 so as to achieve an adequately low threshold for first-Stokes wavelength 526 build-up in the Raman laser resonator 520, considering the available pump power. This scheme may reduce conversion of first-Stokes wavelength 526 light into second-Stokes wavelength 528 light that would otherwise occur as first-Stokes wavelength 526 intensity builds up in the Raman laser resonator 530, thereby increasing the first-Stokes wavelength 526 light intensity, power, and energy that emerges through the output mirror 546 for a given pump power intensity level.

This scheme may be extended to generate higher-order Stokes wavelengths, and to stop the Raman conversion at $S_n$, by making the side wall dichroic coatings 536 highly reflective at the pump wavelength 524 and at all wavelengths $S_1$, $S_2$ . . . $S_n$ and partially or completely transmitting at the $S_{n+1}$ wavelength. This embodiment may be practical only in situations where the wavelength separation between the $S_n$ and $S_{n+1}$ wavelengths is large enough to enable dichroic coatings having the required differential reflectivity/transmission at the two wavelengths. A possible advantage of using the invention to make such a Raman laser is that adjusting the fold angles of a zig-zag path 548 may be a way to finely adjust the cutoff wavelength of the side-wall dichroic coatings 536 so that the cutoff wavelength falls between the $S_n$ and $S_{n+1}$ wavelengths, as needed to improve suppression of $S_{n+1}$ generation.

Figure 21:
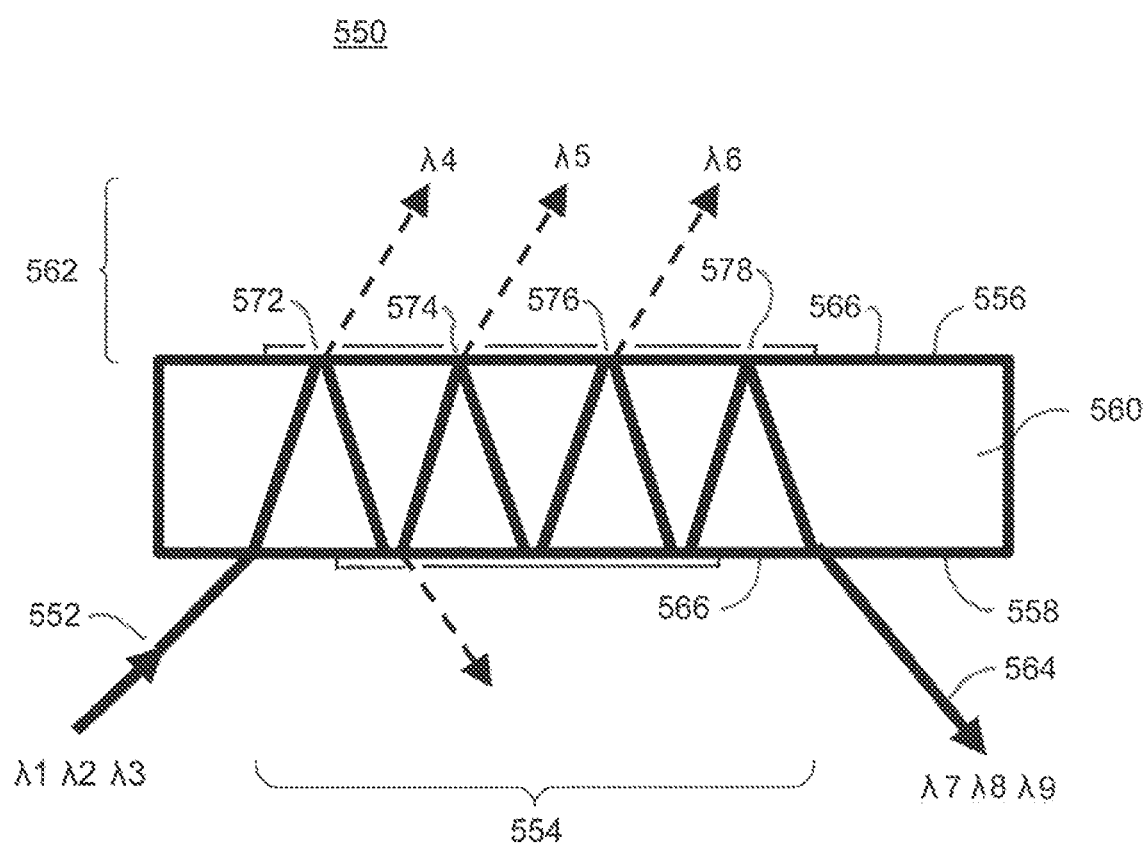
FIG. 21 shows generalized use of the disclosed invention with multiple interacting beams and wavelengths.

FIG. 21 shows a an exemplary embodiment of generic nonlinear optical device 550 in which two, three, four or even more input beams 552 interact along a zig-zag beam path 554 in a nonlinear medium 560 having side-walls 556, 558 that can be parallel sidewalls, as shown, or wedged sidewalls (not shown). The input beams 552 having respective wavelengths $\lambda 1$, $\lambda 2$, 23 may be injected into the nonlinear medium 560 to generate additional wavelengths via some designed nonlinear process that occurs in the nonlinear medium 560. Some dumped light 562 at wavelengths $\lambda 4$, $\lambda 5$, $\lambda 6$ may be partially or completed transmitted at one or more bounce points along the zig-zag path 554, and the dumped wavelengths may be the same as or different from the injected wavelengths. Some output wavelengths 564 (e.g., $\lambda 7$, $\lambda 8$, $\lambda 9$) may emerge from the nonlinear medium 560 as useful emission, some wavelengths may emerge from the nonlinear medium 560 as residual (unconverted) input light, and some wavelengths may emerge from the nonlinear medium 560 as light generated in the nonlinear medium 560 that might not useful ("by-product" wavelengths). The output wavelengths 564 may be the same as, or different from, the input wavelengths 552 and the dumped wavelengths 562.

The interacting beams 552 may all be collinear and follow the same zig-zag path 554. Alternatively, some or all beams may be non-collinear (propagate with a small angle between them) so that they do not follow identical zig-zag paths, but instead follow "substantially the same" zig-zag paths having a similar number of bounce points, similar leg lengths, and similar fold angles.

Side-wall dichroic coatings 566 may be designed to be highly reflective at one or more wavelengths, and partially or completely transmitting at one or more of the interacting beam wavelengths. The side-wall coatings 566 may be designed to dump light on one or both sides of the nonlinear medium 560. The side wall coatings 566 may be "masked" during the optical coating process so that (a) light is dumped at some bounce points 572, 574, 576, 578 along the zig-zag path 554 and not others, or (b) so that some wavelengths may be dumped at some of the bounce points 572. 574, 576, 578 and different wavelengths may be dumped at other of the bounce points 572. 574, 576, 578.

The side-wall coatings 566 and other aspects of the zig-zag configuration (e.g., number of bounce points, fold angles, leg lengths, etc.) may be designed to control some aspect of the emission that emerges from the generic non-linear optical device 550 after following the complete zig-zag beam path 554. Aspects of the emission that may be controlled include conversion efficiency, beam quality, and the specific wavelength or combination of wavelengths that emerges from the optical parametric oscillator 550, among others.

Figure 22:
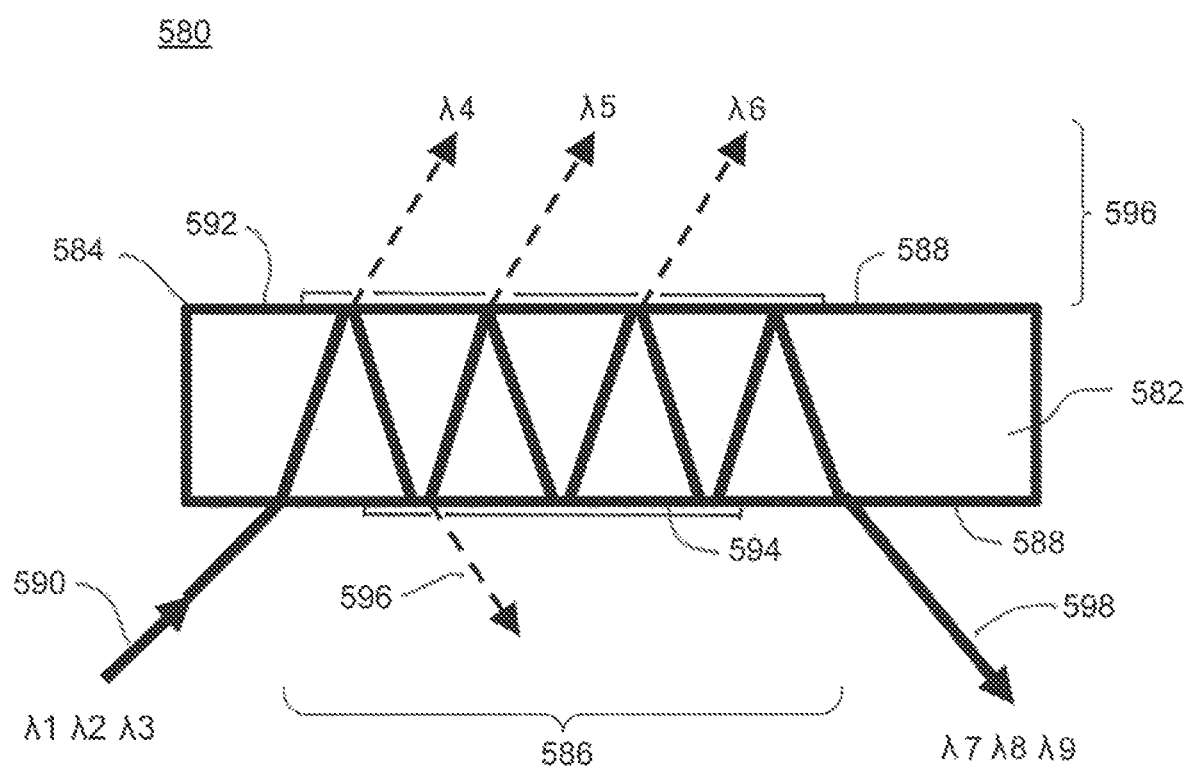
FIG. 22 shows the disclosed invention used with a liquid- or gas-phase nonlinear medium contained within an optical cell.

There is shown in FIG. 22 an exemplary embodiment of an optical parametric oscillator 580, or other nonlinear optical device, in which a nonlinear medium 582 may consist of a liquid- or gas-phase material rather than a solid-state material as in the embodiments disclosed above. The liquid- or gas-phase nonlinear medium 582 may be contained within an optical cell 584. The optical cell 584 may be filled so that at least some, if not all, of a zig-zag path 586 passes through, or is immersed within, the nonlinear medium 582. Both side walls 592, 594 of the optical cell 584 may have thin-film coatings 588 or other optical coatings designed to be highly reflective at one or more wavelengths, and partially or completely transmitting at one or more of input beam 590 wavelengths, $\lambda 1$, $\lambda 2$, $\lambda 3$, for example. The thin-film coatings 588 may be designed to work as expected when the optical cell 584 is filled with the nonlinear medium 582. Dumped light 596 at wavelengths $\lambda 4$, $\lambda 5$, $\lambda 6$, for example, may be emitted at bounce points on the side walls 592, 594 and output wavelengths $\lambda 7$, $\lambda 8$, $\lambda 9$, for example, may be emitted as an output signal 598.

Figure 23:
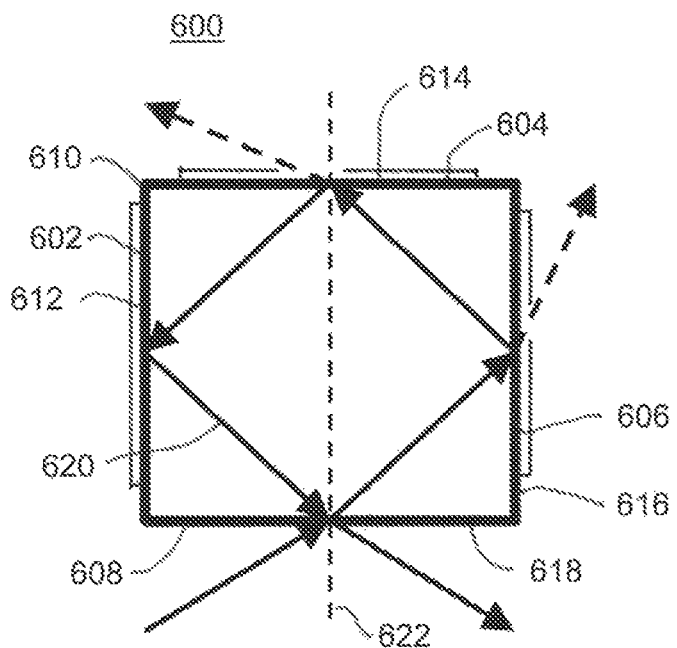
FIG. 23 shows use of the disclosed invention with a square-shaped nonlinear medium.
Figure 24:
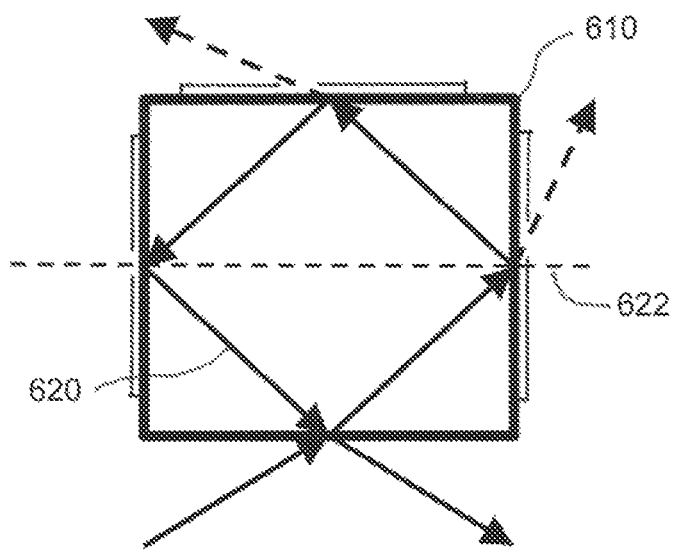
FIG. 24 shows use of the disclosed invention with a square-shaped nonlinear medium.

FIG. 23 shows an exemplary embodiment of an optical parametric oscillator 600, or other nonlinear optical device, in which a square-shaped nonlinear medium 610 includes a thin-film coatings 612, 614, 616 or other optical coatings on three respective side walls 602, 604, 606, with at least one side wall 604 having a dichroic coating 614 where some wavelengths can be partially or completely transmitted, or dumped. A fourth wall 608 may be uncoated, or may have an appropriate anti-reflection coating 618, so that beams may enter and exit the nonlinear medium 610. In essence, this configuration is a three-bounce, four-leg zig-zag path 620 that is folded on itself to make a square-ring path. This configuration may be used with solid, liquid, and gaseous nonlinear media. For the solid-state nonlinear medium 610, having a phase-matching axis 622, that is, a QPM grating vector direction or a non-critical phase-matching axis, such that the desired phase-matching may be achieved in two, or all four, legs of the square beam path 620 for the same set of interacting beam wavelengths. This phase-matching axis 622 may also be rotated by 90 degrees, as shown in FIG. 24 while still achieving the desired phase-matching in the nonlinear medium 610 in two or all four beam legs 620.

Figure 25:
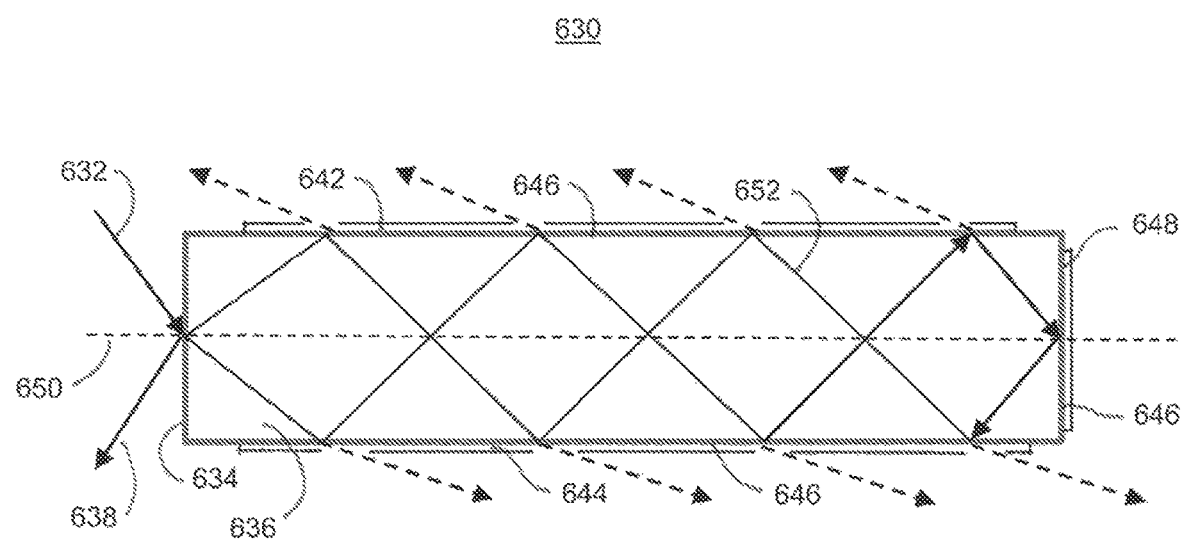
FIG. 25 shows a monolithic two-pass optical parametric amplifier, or an optical parametric amplifier, in accordance with an aspect of the present invention.

FIG. 25 is an exemplary embodiment of the invention functioning as a monolithic two-pass optical parametric amplifier 630. In this configuration, interacting beams make two passes through the optical parametric amplifier 630 and, without the need for a Faraday isolator, input and output beams are separated "geometrically."

Input beam(s) 632 may enter at a first surface 634 of a nonlinear medium 636. Output beam(s) 638 may exit at the first surface 634. The first surface 634 may be uncoated or AR-coated. At least one of side walls 642, 644 may have a dichroic coating 646 that is partially or completely transmitting at specified wavelengths to be dumped. An end wall 648 may have the same dichroic coating 646 as the side walls 642, 644. Alternatively, (a) the end wall 648 may have a highly reflective coating at all or some of the interacting wavelengths, or (b) the end wall 648 may be uncoated so that total internal reflection (TIR) occurs at the internal surface of the end wall 648.

The configuration shown in FIG. 25 may be used with solid, liquid, or gaseous nonlinear media. If a solid-state nonlinear medium 636 is used, a phase-matching axis 650 may be oriented along a non-critical phase-matching axis of the bulk nonlinear medium 636. Alternatively, the phase-matching axis 650 may be oriented along a grating vector direction of a periodically-poled nonlinear material designed for quasi-phase-matching. As shown, and depending on various design details, every other beam leg, or all beam legs, of zig-zag path 652 may achieve phase-matching for the same set of interacting wavelengths. In another exemplary embodiment, the phase-matching axis 650 may be rotated by 90 degrees from that shown in FIG. 25 while still maintaining phase-matching in every other beam leg, or in all beam legs, depending on various design details. As someone versed in the art will appreciate, external mirrors (not shown) can be placed around the optical parametric amplifier 630 to make a ring optical parametric oscillator device.

The detailed descriptions of embodiments provided above are intended only to be exemplary and explanatory and are not intended to be restrictive of the invention. The word "parallel" is used to indicate "nominally parallel" optical surfaces that are parallel within standard optical fabrication tolerances, and is not meant to indicate that surfaces must be exactly parallel. Unless indicated otherwise, the term "wedged" or "non-parallel" is meant to indicate that optical surfaces have a designed angle between them of 0.1 degrees or more, and at least one such angle in at least one geometric plane.

The thin-film or other optical coatings that establish the zig-zag beam path may be coated directly onto the side walls of the nonlinear crystal or medium. Alternatively, they may be coated onto one or two separate and discrete optical substrates that may be positioned at or near the side walls of the nonlinear medium and aligned so as to create the desired zig-zag path within the nonlinear medium. In the latter case, the side walls of the nonlinear medium may be AR-coated at one or more of the interacting beam wavelengths, or the side walls may be uncoated, so that the legs of the zig-zag path may enter and exit the nonlinear medium.

The dichroic optical coatings that establish the zig-zag beam path may be standard thin-film optical coatings that are well known in the art. However, the walls that establish the zig-zag path may have any dichroic optical coating or surface treatment that provides different reflectivity or transmission values at different interacting beam wavelengths as needed to control some aspect of the nonlinear process. The "coating" may in fact not be thin-film coating at all, but instead may be a meso- or nano-structured surface that provides the required wavelength reflectivity values, transmission values, and selectivity.

The fold angles at the bounce points of the zig-zag beam path may span a wide range of values as long as the fold angles are not so large that total internal reflection (TIR)

occurs at the side walls of the nonlinear medium. The maximum allowed fold angle depends on numerous details relating to the design of the nonlinear crystal or medium, but in most cases of interest it is easy to avoid the maximum allowed fold angle. In a case where non-parallel side walls are employed, thereby resulting in changing fold angles at the bounce points, TIR may occur at some of the bounce points and still be consistent with the spirit of the invention as long as (i) TIR does not occur at all of the bounce points, and (ii) dichroic coatings at the non-TIR bounce points are used to control some aspect of the nonlinear conversion.

The embodiments described above involve multiple interacting beams traversing a zig-zag beam path through a bulk solid-sate nonlinear crystal or medium. However, the invention may also be used with a nonlinear medium that acts as an optical waveguide for at least one of the interacting beam wavelengths, but in a plane that is orthogonal to the plane of the zig-zag beam path.

In general, each of the interacting beams that reflect at the bounce points may experience a different phase change according to details of the dichroic optical coating used on the side walls, the angle(s) of incidence of the reflecting beams at the bounce points, beam polarization, and other factors. This differential phase change may or may not be important depending on numerous design details, but should be considered when trying to optimize performance of the nonlinear optical device. For example, in an optical parametric oscillator or optical parametric amplifier, dephasing that may occur between the pump, signal, and idler beams at the bounce points may be detrimental to some aspect of device performance. When it happens, this situation can often be avoided or mitigated by ensuring that transmission of the dumped wave, at the one or more bounce points, is a high enough value so that the dumped wave builds up from a very low value in each leg of the zig-zag path. In some cases, it may be desirable to have near 100% transmission of the dumped wave at the bounce points so that the dumped wave is forced to build up a from a quantum noise level after each dumping occurrence.

Some of the embodiments described above involve an optical parametric oscillator having a two-mirror standing-wave resonator. It is readily understood by someone well-versed in the art that the invention may also be used with standing-wave or ring resonators having more than two mirrors.

It is to be understood that the description herein is only exemplary of the invention, and is intended to provide an overview for the understanding of the nature and character of the disclosed optical parametric amplifiers. The accompanying drawings are included to provide a further understanding of various features and embodiments of the methods and devices of the invention which, together with their description serve to explain the principles and operation of the invention.

What is claimed is:

1. An optical parametric oscillator suitable for generating a beam of coherent pump radiation, said oscillator comprising:
    a nonlinear medium having a first end and a second end spaced at a specified length, said nonlinear medium further having a first side wall and a second side wall spaced at a specified width, said first side wall having a first optically polished surface, said second side wall having a second optically polished surface, said specified length and said specified width having been determined to optimize beam quality in said nonlinear medium;
    a first coating on at least a portion of said first side wall, said first coating at least partially reflecting the beam of coherent pump radiation;
    a second coating on at least a portion of said second side wall, said second coating at least partially reflecting the beam of coherent pump radiation such that an injected beam of coherent pump radiation follows a designated zig-zag beam path within said nonlinear medium;
    a first dichroic mirror placed between the beam of coherent pump radiation and said first end of said nonlinear medium; and
    a second dichroic mirror placed at said second end of said nonlinear medium;
    said first dichroic mirror and said second dichroic mirror being selectively positioned and separated, with respect to said nonlinear medium, so as to achieve a desired resonator Fresnel number for said optical parametric oscillator by which to provide control of the beam quality of the coherent emission generated by said optical parametric oscillator.

2. The nonlinear optical parametric oscillator as in claim 1, wherein said specified length and said specified width of said nonlinear medium are selected so as to produce at least one of a specific number of zig-zag bounces, a specific zig-zag fold angle, and a specific zig-zag leg length in said zig-zag beam path, to provide control of back-conversion in said nonlinear medium.

3. The nonlinear optical parametric oscillator as in claim 1, wherein said first coating is at least partially transmitting at a non-resonated radiation wavelength so as to dump non-resonated energy at zig-zag beam path bounce points on said nonlinear medium.

4. The nonlinear optical parametric oscillator as in claim 1, wherein said second dichroic mirror is highly-transmitting at a pump radiation wavelength so as to configure said optical parametric oscillator as a single-pass-pumped, singly-resonant optical parametric oscillator.

5. The nonlinear optical parametric oscillator as in claim 1, wherein said second dichroic mirror is at least partially-reflective at a pump radiation wavelength so as to configure said optical parametric oscillator as a two-pass-pumped optical parametric oscillator.

6. The nonlinear optical parametric oscillator as in claim 1, wherein said nonlinear medium comprises a nonlinear Raman active medium so as to provide a stimulated Raman laser resonator.

7. The nonlinear optical parametric oscillator as in claim 1, wherein each said first coating and said second coating comprise a dichroic coating highly-reflective at a wavelength of the coherent pump radiation and at a first Stokes wavelength, and wherein each said dichroic coating is at least partially-transmissive at a second Stokes wavelength.

8. An injection-seeded oscillator suitable for receiving a beam of coherent pump radiation and a seed signal beam, said oscillator comprising:
    a nonlinear medium having a first end and a second end spaced at a specified length, said nonlinear medium further having a first side wall and a second side wall spaced at a specified width, said first side wall having a first optically polished surface, said second side wall having a second optically polished surface, said specified length and said specified width having been determined to optimize beam quality in said nonlinear medium;

a first coating on at least a portion of said first side wall, said first coating at least partially reflecting an injected beam of coherent pump radiation and an injected seed signal beam;

a second coating on at least a portion of said second side wall, said second coating at least partially reflecting said injected beam of coherent pump radiation and said injected seed signal beam such that said injected beam of coherent pump radiation and said injected seed signal beam follow designated zig-zag beam paths between said first coating and said second coating;

a dichroic beamsplitter/combiner placed between said first end of said nonlinear medium and at least one of the beam of coherent pump radiation and the seed signal beam;

a first dichroic mirror placed between said dichroic beamsplitter/combiner and said first end of said nonlinear medium; and a second dichroic mirror placed at said second end of said nonlinear medium;

said first dichroic mirror and said second dichroic mirror being selectively positioned and separated with respect to said nonlinear medium to achieve a desired resonator Fresnel number for said oscillator by which to provide control of emitted beam quality of said nonlinear oscillator.

9. The oscillator as in claim 8, wherein said specified length and said specified width of said nonlinear medium are selected so as to produce, in the beam of coherent pump radiation and in the injected seed signal beam, at least one of a specific number of zig-zag bounces, a specific zig-zag fold angle, and a specific zig-zag leg length in said zig-zag beam path, by which to provide control of back-conversion in said nonlinear medium.

10. The oscillator as in claim 8, wherein said first coating is at least partially transmitting at a non-resonated radiation wavelength so as to dump non-resonated energy at zig-zag beam path bounce points on said nonlinear medium.

11. The oscillator as in claim 8, wherein said second dichroic mirror is highly-transmitting at a pump radiation wavelength so as to configure said optical parametric oscillator as a single-pass-pumped, singly-resonant optical parametric oscillator.

12. The oscillator as in claim 8, wherein said second dichroic mirror is at least partially-reflective at a pump radiation wavelength so as to configure said optical parametric oscillator as a two-pass-pumped optical parametric oscillator.

13. The nonlinear optical parametric oscillator as in claim 8, wherein each said dichroic coating is highly-reflective at both a pump wavelength and a first Stokes wavelength, and wherein each said dichroic coating is at least partially-transmissive at a second Stokes wavelength.

14. A method for independently controlling radiation beam quality and resonator Fresnel number in an optical oscillator, said method comprising the steps of:

providing a nonlinear medium of a specified length, said nonlinear medium having a first side wall and a second side wall spaced at a specified width, said first side wall having a first optically polished surface, said second side wall having a second optically polished surface;

selecting said specified length and said specified width so as to mitigate back-conversion in said nonlinear medium;

providing at least one beam of coherent radiation having at least one wavelength;

providing a first coating on at least a portion of said first optically polished surface, said first coating at least partially reflective at said least one wavelength;

providing a second coating on at least a portion of said second optically polished surface, said second coating at least partially reflective at said least one wavelength;

injecting said at least one beam of coherent radiation through a dichroic input mirror into said nonlinear medium such that at least one zig-zag beam path is established within said nonlinear medium, said at least one zig-zag beam path having zig-zag beam path bounce points on said side walls;

providing a dichroic output mirror by which to form a nonlinear optical parametric oscillator; and, positioning, with respect to said nonlinear medium, and spacing apart, said dichroic mirrors so as to achieve a desired resonator Fresnel number in said optical oscillator.

15. The method as in claim 14 wherein said step of selecting said specified length and said specified width comprises the step of optimizing at least one of a number-of-bounces parameter, a fold angle parameter, and a leg length parameter for said zig zag beam path.

16. The method as in claim 14 wherein said first coating is partially transmissive or highly-transmissive at a non-resonated radiation wavelength so as to dump non-resonated energy at said zig-zag beam path bounce points on said nonlinear medium.

17. The method as in claim 14 wherein said step of injecting said input beam through a dichroic input mirror into said nonlinear medium comprises either a step of injecting said input beam collinearly or injecting said input beam non-collinearly.

18. The method as in claim 14 wherein said dichroic output mirror functions to separate an output beam of a first wavelength from an output beam of a second wavelength.

* * * * *